(12) United States Patent
Kakinuma et al.

(10) Patent No.: US 7,717,200 B2
(45) Date of Patent: May 18, 2010

(54) COAXIAL TWO-WHEEL VEHICLE

(75) Inventors: Takekazu Kakinuma, Tokyo (JP); Ikuo Yamano, Kanagawa (JP); Kunihito Sawai, Kanagawa (JP)

(73) Assignee: Toyota Jidosha Kabuhsiki Kaisha, Toyota-shi (JP)

( * ) Notice: Subject to any disclaimer, the term of this patent is extended or adjusted under 35 U.S.C. 154(b) by 150 days.

(21) Appl. No.: 11/785,647

(22) Filed: Apr. 19, 2007

(65) Prior Publication Data

US 2007/0251735 A1    Nov. 1, 2007

Related U.S. Application Data

(63) Continuation-in-part of application No. 11/402,975, filed on Apr. 13, 2006.

(30) Foreign Application Priority Data

Apr. 14, 2005   (JP) .......................... P2005-117365
Apr. 6, 2006    (JP) .......................... P2006-105731

(51) Int. Cl.
    *B62D 11/04*    (2006.01)
(52) U.S. Cl. .................... 180/6.5; 180/218; 280/87.041
(58) Field of Classification Search ................ 180/65.1, 180/65.5, 180, 181, 218; 280/652, 87.041, 280/33.992
    See application file for complete search history.

(56) References Cited

U.S. PATENT DOCUMENTS

| | | | | |
|---|---|---|---|---|
| 1,697,994 A | * | 1/1929 | Moore, Jr. ............... | 280/87.042 |
| 2,726,845 A | * | 12/1955 | Hyslop, Jr. et al. .......... | 254/131 |
| 2,825,575 A | * | 3/1958 | Mickels .................. | 280/87.042 |
| 3,693,987 A | | 9/1972 | Bobard et al. | |
| 3,712,404 A | | 1/1973 | Walquist | |
| 3,833,215 A | * | 9/1974 | Isdith ........................ | 482/51 |
| 4,354,569 A | * | 10/1982 | Eichholz .................... | 180/211 |
| 4,790,548 A | * | 12/1988 | Decelles et al. ............. | 280/5.26 |
| 4,794,999 A | * | 1/1989 | Hester ....................... | 180/8.2 |
| 4,919,225 A | * | 4/1990 | Sturges ...................... | 180/210 |
| 5,562,176 A | * | 10/1996 | Lucernoni et al. ........... | 180/180 |
| 6,288,505 B1 | * | 9/2001 | Heinzmann et al. ......... | 318/139 |
| 6,367,817 B1 | * | 4/2002 | Kamen et al. ............. | 280/5.507 |

(Continued)

FOREIGN PATENT DOCUMENTS

JP    63-305082    12/1988

(Continued)

*Primary Examiner*—Glenn Dayoan
*Assistant Examiner*—Bridget Avery
(74) *Attorney, Agent, or Firm*—Oblon, Spivak, McClelland, Maier & Neustadt, L.L.P.

(57) ABSTRACT

A coaxial two-wheel vehicle is provided. The coaxial two-wheel vehicle includes a step plate for a rider to ride on; a vehicle body supporting the step plate to be capable of changing a posture in a roll direction of rotating around a roll axis as the center when a traveling direction is set to the roll axis; and a pair of wheels disposed on the same axis at both sides of the vehicle body in a direction orthogonal to the traveling direction and rotatably supported by the vehicle body. Further, the coaxial two-wheel vehicle includes a pair of wheel drivers driving and rotating the pair of wheels independently and a control lever directly changing a posture of the step plate or indirectly changing the posture through the vehicle body.

19 Claims, 25 Drawing Sheets

U.S. PATENT DOCUMENTS

| | | | |
|---|---|---|---|
| 6,390,216 B1 * | 5/2002 | Sueshige et al. | 180/65.5 |
| 6,651,766 B2 * | 11/2003 | Kamen et al. | 180/218 |
| 6,662,889 B2 * | 12/2003 | De Fazio et al. | 180/22 |
| 7,011,171 B1 * | 3/2006 | Poulter | 180/8.2 |
| 7,178,614 B2 | 2/2007 | Ishii | |
| 7,303,032 B2 * | 12/2007 | Kahlert et al. | 180/65.1 |

FOREIGN PATENT DOCUMENTS

| | | |
|---|---|---|
| JP | 04-201793 | 7/1992 |
| JP | 2004-74814 | 3/2004 |
| JP | 2005-1554 | 1/2005 |
| JP | 2005-006435 | 1/2005 |
| JP | 2005-006436 | 1/2005 |
| JP | 2005-39962 | 2/2005 |
| JP | 2006-1385 | 1/2006 |

* cited by examiner

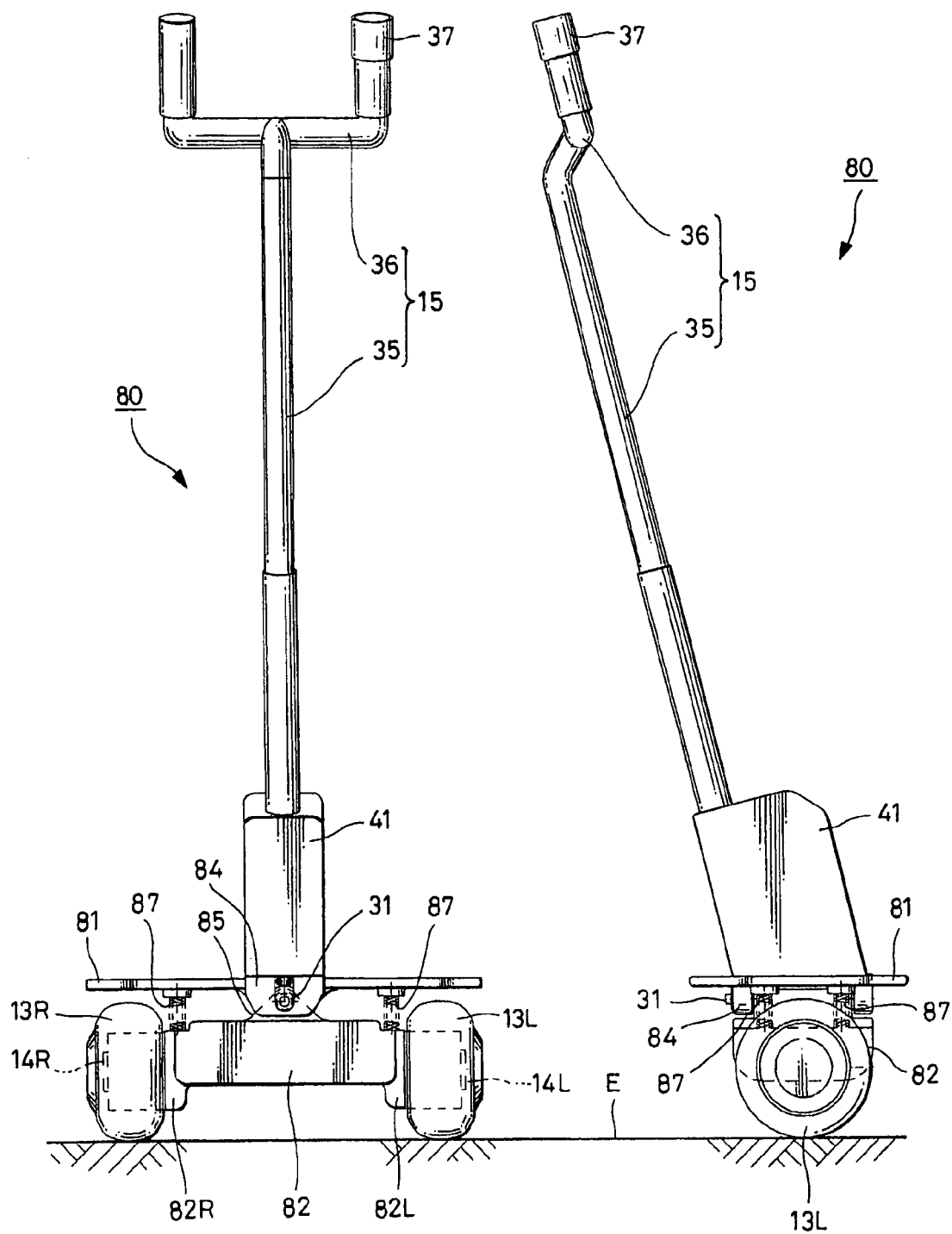

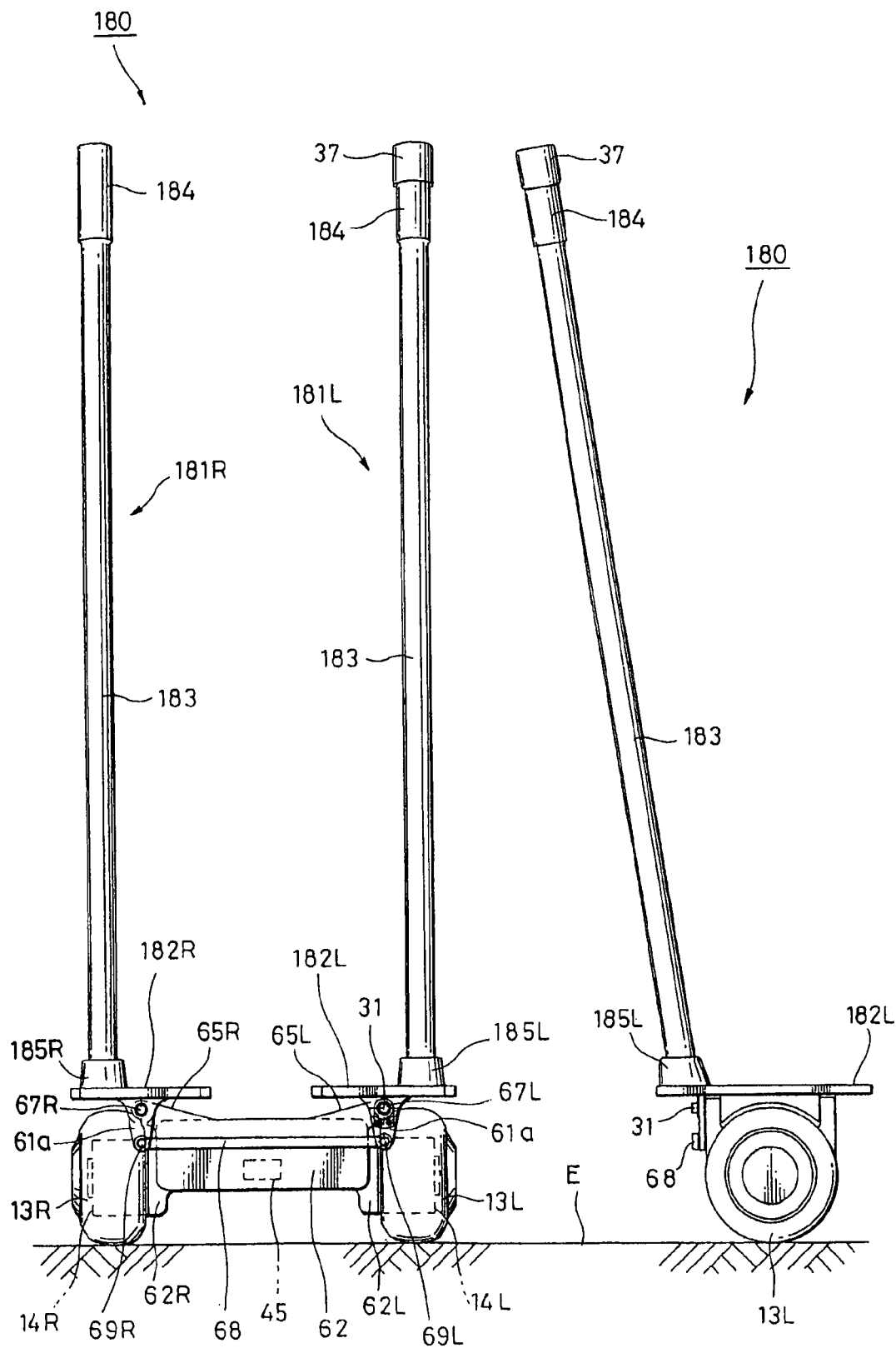

COAXIAL TWO-WHEEL VEHICLE

CROSS REFERENCES TO RELATED APPLICATIONS

The present application is a Continuation-In-Part of the patent application Ser. No. 11/402,975, filed Apr. 13, 2006, which claims priority to application JP-2005-117365 filed on Apr. 14, 2005 and application JP-2006-105731 filed on Apr. 6, 2006, the entire contents of which are incorporated herein by reference.

BACKGROUND OF THE INVENTION

1. Field of the Invention

The present invention relates to a coaxial two-wheel vehicle including two wheels disposed on the same axis center line, particularly relates to a coaxial two-wheel vehicle which can travel freely with a person riding thereon.

2. Description of the Related Art

Japanese Published Patent Application No. 04-201793 discloses a coaxial two-wheel vehicle of this kind in related art, for example. This patent reference discloses a travel controller for an unstable vehicle, which enables an easily falling unstable vehicle to travel stably. The travel controller described in this patent reference is an apparatus controlling a travel of an unstable vehicle which includes at least two wheels disposed at other positions than a position on the same straight line parallel with a forwarding direction and a seat fixed on a wheel shaft connecting those wheels and in which the center of gravity is positioned above a rotational axis line of those wheels. Further, this apparatus includes a detector, a driver and a control value decider. The detector detects a tilt angle and/or a tilt angular velocity of a line connecting the rotational axis line and the center-of-gravity position with respect to a gravitational direction orthogonal to the wheel shaft. The driver is fixed to the wheels to drive the wheels. The control value decider decides a control value of this driver such that the above-described detection value is reduced.

According to the travel controller for an unstable vehicle having such configuration described in the above patent reference, it is expected to have such effectiveness that the vehicle is inclined in a desired back and forth direction and so the vehicle can travel in that desired direction. In addition, since only two wheels contact the ground, the vehicle is capable of making a small turn and of traveling through a narrow place without difficulty (refer to a paragraph regarding "The Effect of The Invention").

Japanese Published Patent Application No. 2005-6436 discloses another coaxial two-wheel vehicle in related art, for example. This patent reference discloses a coaxial two-wheel vehicle including wheels at both ends on the same axle. The coaxial two-wheel vehicle described in this patent reference includes a pair of wheels, a wheel axle, a base, a pair of drive motors and a controller. The wheel axle is installed between the pair of wheels. The base is supported on the wheel axle in a manner capable of moving on a tilt. The pair of drive motors are mounted on the base in order to drive each of the pair of wheels. The controller sends an operation command to the pair of drive motors. The base includes an acceleration detector detecting acceleration in the vertical direction, and the controller sends the operation command to decelerate the vehicle to each of the pair of drive motors when an absolute value of acceleration detected by the acceleration detector during a travel is equal to or more than a predetermined threshold value.

According to the coaxial two-wheel vehicle of the above Japanese Published Patent Application No. 2005-6436 having such configuration, it is expected to have such effectiveness as in the followings. The coaxial two-wheel vehicle includes the acceleration detector to detect the acceleration in the vertical direction. Therefore, in the case where the absolute value of acceleration detected by the acceleration detector during the travel is equal to or more than the predetermined threshold value such as the case of the vehicle running on a step, for example, the vehicle can travel safely by following the step or the like, because the detector sends the operation command of deceleration to each of the pair of drive motors.

Further, Specification of U.S. Pat. No. 5,791,425 discloses further another coaxial two-wheel vehicle in related art. This patent reference discloses a transportation vehicle with a loop control. The transportation vehicle described in this patent reference includes a platform for a rider to ride on, right and left wheel groups, a pair of wheel drivers, a handle, and the like. The right and left wheel groups each have a plurality of wheels disposed in a direction orthogonal to a traveling direction of the platform. The pair of wheel drivers drive and rotate the right and left wheel groups individually. The handle with a grip on the top end is installed upright on the upper surface of the platform.

However, in each of the coaxial two-wheel vehicles described in the above-described patent references, the handle is installed upright by fixing the bottom end thereof to a step plate (a frame in the first patent reference, a base in the second patent reference, and a platform in the third patent reference) as a riding portion for a person to ride on. Further, a support portion supporting the wheels in a freely rotatable manner (a DC servo motor in the first patent reference, a motor and the like in the second patent reference, a drive with motor in the last patent reference) is fixed to the step plate. Therefore, the upper surface of the step plate (riding surface) is continuously parallel with a traveling surface (road surface). Accordingly, when the center of gravity is at a high position where a person is riding on the vehicle in a standing posture, an upper body of the rider is swayed right and left and becomes unstable by the action of the gravitational force during a travel on a cant road surface where the road surface inclines in the direction orthogonal to the traveling direction or by the action of the centrifugal force during making a turn. Accordingly, there is a possibility that the vehicle body falls in a lateral direction when such force becomes considerably large.

Details are explained in this regard by referring to FIGS. 1 through 3. FIGS. 1A through 1C are explanatory diagrams respectively showing a state of the coaxial two-wheel vehicle of related art viewed from the front side of the vehicle. FIGS. 1A through 1C show the whole of a coaxial two-wheel vehicle 1 including a vehicle body 2 also used as a step plate. Left and right wheels 3L and 3R are rotatably provided on both sides in the direction orthogonal to a traveling direction of the vehicle body 2. In addition, reference numeral 4 denotes a riding object (such as a person, for example) riding on the vehicle body 2, reference symbol G denotes the center of gravity of the rider 4, and reference symbol W denotes the weight (load) of the rider 4.

FIG. 1A shows a state of the coaxial two-wheel vehicle 1 traveling straight on a flat road surface without an influence of lateral force and centrifugal force. In this state, the center of gravity G of the rider 4 is positioned approximately above the center of the coaxial two-wheel vehicle 1 and the load W acts vertically to work at the approximately center of the vehicle body 2. Accordingly, approximately the same load acts on the left and right wheels 3L and 3R, and the reaction force thereof becomes approximately the same at ground contact points TL and TR where those wheels 3L and 3R contact with a road surface E.

FIG. 1B shows a state of the coaxial two-wheel vehicle 1 making a turn on the flat road surface E. In this state, centrifugal force (lateral force) F acts on the rider 4 from the right wheel 3R side, and a weight vector W of the load W slants by an angle θ due to the influence of the centrifugal force F. When a ground contact point R where an extended line of the weight vector W intersects the road surface E is inside the ground contact point TL of the left wheel 3L, the coaxial two-wheel vehicle 1 can make a turn with stability. However, when the ground contact point R shifts to the outside of the ground contact point TL as shown in FIG. 1C, the stability of the traveling may not be obtained because the left and right wheels 3L, 3R are unable to bear the centrifugal force F. Then, the coaxial two-wheel vehicle 1 may overturn (falling in the lateral direction) when the centrifugal force F that acts on the rider 4 becomes considerably large.

A difficulty level causing this coaxial two-wheel vehicle 1 to overturn greatly depends on the height of the center of gravity G of the rider 4. FIG. 2 is a diagram to explain the above. When the center of gravity G of the rider 4 is at a low position, a tilt angle allowed to the weight vector W of the center of gravity G is an angle θ as shown in FIG. 2. However, when the center of gravity G of the rider 4 is shifted to a high position, that is, to the center of gravity G1, the tilt angle at the center of gravity G1 becomes an angle θ1 which is smaller than the angle θ (θ1<θ), because a distance S from the center of the vehicle body 2 to the ground contact points TL and TR of the left and right wheel 3L and 3R remains unchanged.

From the above, the difficulty level of causing the coaxial two-wheel vehicle 1 to overturn is expressed by a product of the height of the center of gravity G and the centrifugal force F. Specifically, assuming that the ground contact point R of the weight vector W corresponds to the ground contact point TL of the left wheel 3L when the centrifugal force F acts on the center of gravity G, F×H=S (expression 1) can be obtained. Similarly, assuming that the ground contact point R of a weight vector W1 corresponds to the ground contact point TL of the left wheel 3L when a centrifugal force F1 acts on the center of gravity G1, F1×H1=S (expression 2) can be obtained. Accordingly, F×H=F1×H1. Here, F>F1 because H<H1. Therefore, when the center of gravity is positioned higher, the coaxial two-wheel vehicle 1 may overturn, even if the centrifugal force becomes smaller to that extent.

Such overturn of the coaxial two-wheel vehicle 1 can be prevented with a structure shown in FIG. 3. FIG. 3 is a diagram showing the vehicle body 2 being inclined toward the road surface E on the right wheel 3R side where the centrifugal force F acts. When the vehicle body 2 is thus inclined to the side where the centrifugal force F acts, overturn of the coaxial two-wheel vehicle 1 can be prevented and a stable turning can be made, because the ground contact point R of the weight vector W1 shifts to the inside of the ground contact point TL of the left wheel 3L.

SUMMARY OF THE INVENTION

With respect to a coaxial two-wheel vehicle in related art, the upper surface (riding surface) of a step plate is continuously parallel with a traveling surface (road surface). Therefore, an upper body of a rider becomes unstable by being swayed left and right due to an action of gravitational force at the time of traveling on a cant road surface and due to an action of centrifugal force at the time of turning when the center of gravity is at a high position in a standing posture in which a person is riding in a standing state. Accordingly, there is a possibility that the vehicle may overturn when such force becomes considerably large.

A coaxial two-wheel vehicle according to an embodiment of the present invention is configured to have a step plate, a vehicle body, a pair of wheels, a pair of wheel drivers and a control lever. The step plate is provided for a rider to ride on. The vehicle body supports the step plate to be capable of changing a posture in a roll direction of rotating around a roll axis as the center when the traveling direction is set as the roll axis. The pair of wheels are disposed on the same axis at both sides of the vehicle body in a direction orthogonal to the traveling direction and rotatably supported by the vehicle body. The pair of wheel drivers drive and rotate the pair of wheels independently. The control lever directly changes a posture of the step plate or indirectly changes the posture through the vehicle body.

According to an embodiment of the coaxial two-wheel vehicle, the posture of the control lever or step plate is modified at the time of making a turn and the like so that the ground contact point of the weight vector of the center of gravity of the rider (driver) is shifted to the inside of the ground contact point of the wheel. Accordingly, an overturn of the coaxial two-wheel vehicle is prevented and a stable turning becomes possible.

BRIEF DESCRIPTION OF THE DRAWINGS

FIGS. 1A through 1C are explanatory diagrams for explaining a relation between a coaxial two-wheel vehicle and centrifugal force, in which FIG. 1A shows a state of the centrifugal force not acting, FIG. 1B shows a state of the centrifugal force acting, FIG. 1C shows a state of the vehicle being overturned by the centrifugal force, respectively;

FIGS. 4A and 4B are diagrams showing a coaxial two-wheel vehicle according to a first embodiment of the present invention, in which FIG. 4A is a front view and FIG. 4B is a lateral view;

FIGS. 13A through 13C are explanatory diagrams for explaining a traveling state of the coaxial two-wheel vehicle according to the first embodiment of the present invention, in which FIG. 13A shows a straight travel on a flat road surface, FIG. 13B shows a turning on a flat road surface, and FIG. 13C shows a straight travel on a cant road surface, respectively;

FIGS. 14A and 14B are diagrams showing a coaxial two-wheel vehicle according to a second embodiment of the present invention, in which FIG. 14A is a front view and FIG. 14B is a lateral view;

FIGS. 15A and 15B are explanatory diagrams showing an enlarged relevant part of the coaxial two-wheel vehicle shown in FIG. 14A, in which FIG. 15A is a state of straight travel and FIG. 15B is a state of turning, respectively;

FIGS. 16A and 16B are diagrams showing a coaxial two-wheel vehicle according to a third embodiment of the present invention, in which FIG. 16A is a front view and FIG. 16B is a lateral view;

FIGS. 17A and 17B are explanatory diagrams showing an enlarged relevant part of the coaxial two-wheel vehicle shown in FIG. 16A, in which FIG. 17A is a state of straight travel and FIG. 17B is a state of turning, respectively;

FIGS. 18A and 18B are diagrams showing a coaxial two-wheel vehicle according to a fourth embodiment of the present invention, in which FIG. 18A is a front view and FIG. 18B is a lateral view;

FIGS. 19A and 19B are explanatory diagrams showing an enlarged relevant part of the coaxial two-wheel vehicle shown in FIG. 18A, in which FIG. 19A is a state of straight travel and FIG. 19B is a state of turning, respectively;

FIGS. 21A and 21B are diagrams showing a coaxial two-wheel vehicle according to a fifth embodiment of the present invention, in which FIG. 21A is a front view and FIG. 21B is a lateral view;

FIGS. 22A and 22B are cross-sectional diagrams showing a saddle support link relating to a coaxial two-wheel vehicle according to a sixth embodiment of the present invention, in which FIG. 22A is a cross-sectional view of a retracted state and FIG. 22B is a cross-sectional view of a stretched state;

FIGS. 28A and 28B are diagrams showing a coaxial two-wheel vehicle according to an eighth embodiment of the present invention, in which FIG. 28A is a front view and FIG. 28B is a lateral view; and FIGS. 29A and 29B are explanatory diagrams showing an enlarged relevant part of the coaxial two-wheel vehicle shown in FIG. 28A, in which FIG. 29A is a state of straight travel and FIG. 29B is a state of turning, respectively.

DESCRIPTION OF THE PREFERRED EMBODIMENTS

A coaxial two-heel vehicle capable of performing a stable turning without easily causing an overturn is obtained with a simplified structure. The coaxial two-wheel vehicle is configured such that a center-of-gravity position of a rider is shifted to the inside of a turning radius when making a turn in order to be balanced with the centrifugal force applied to the rider.

Figure 1A:
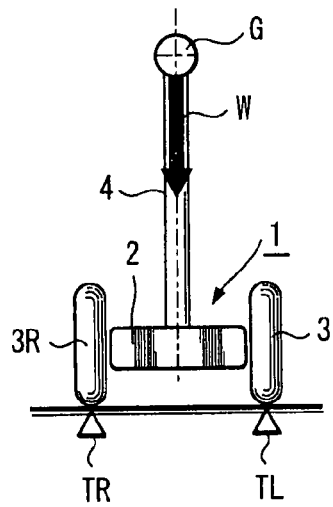
Figure 1B:
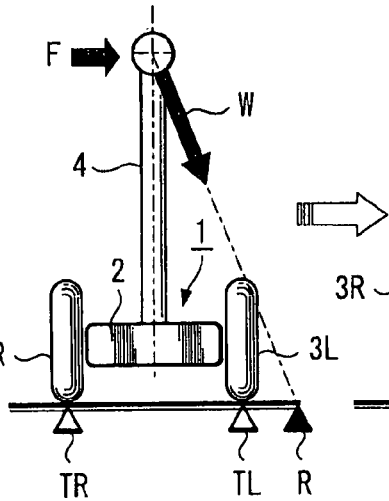
Figure 1C:
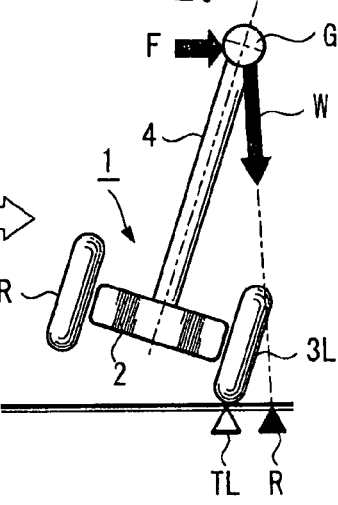
Figure 2:
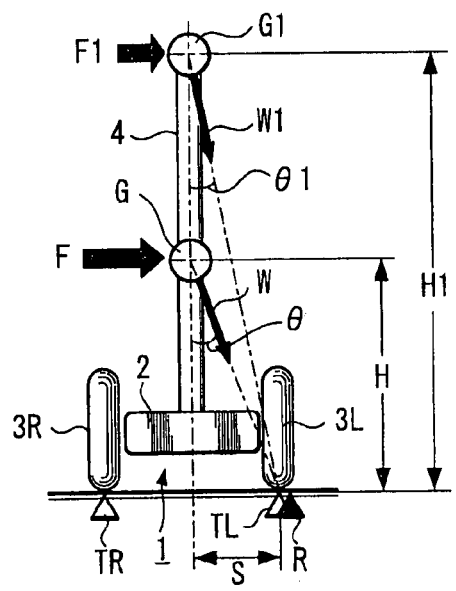
FIG. 2 is an explanatory diagram for explaining a relation among a coaxial two-wheel vehicle, centrifugal force, and a height of the center of gravity of a rider.
Figure 3:
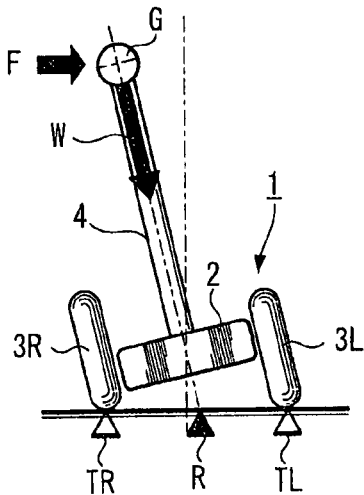
FIG. 3 is an explanatory diagram showing a countermeasure against centrifugal force that acts on a coaxial two-wheel vehicle.
Figures 4A, 4B:
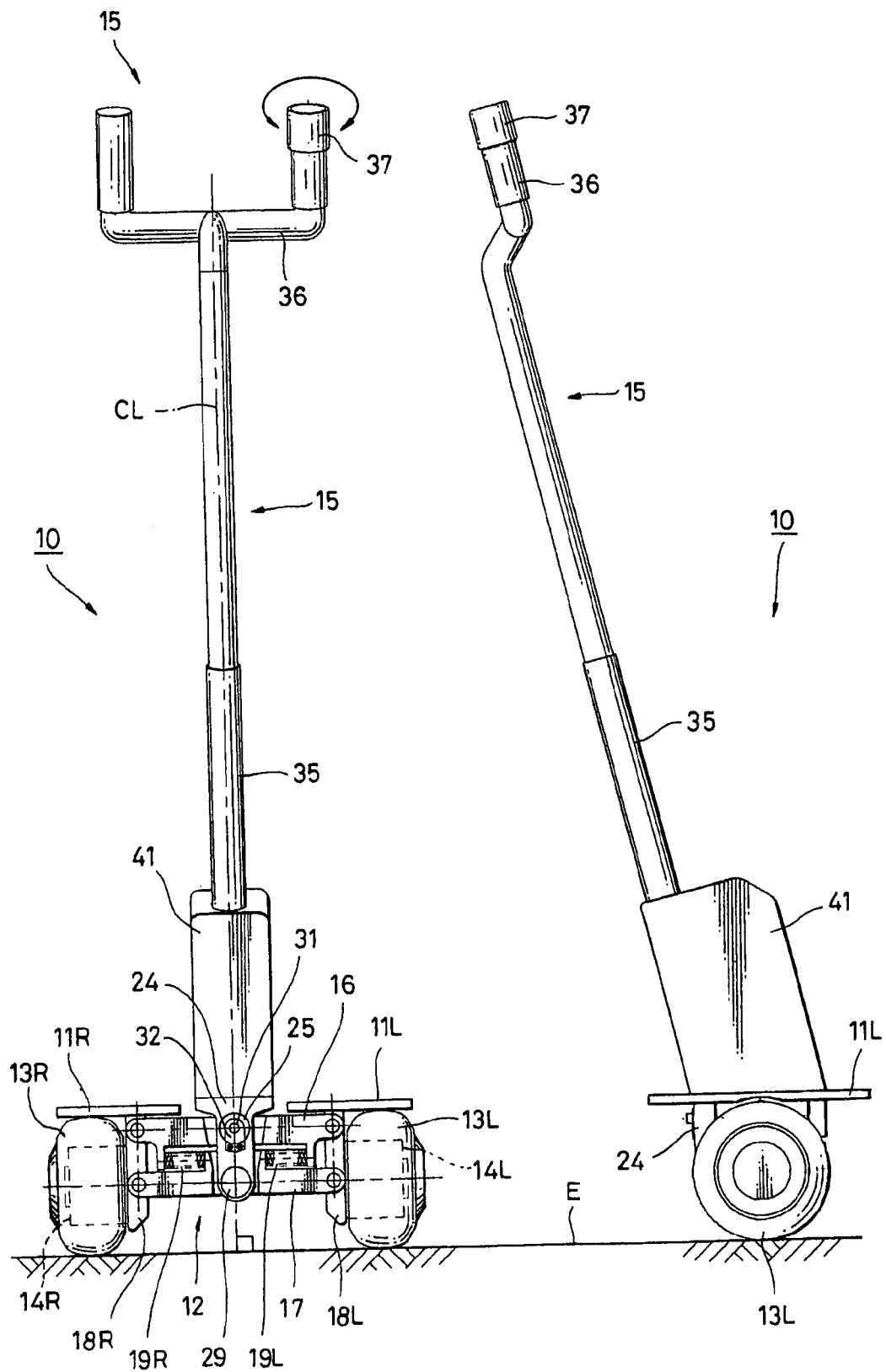
Figure 5:
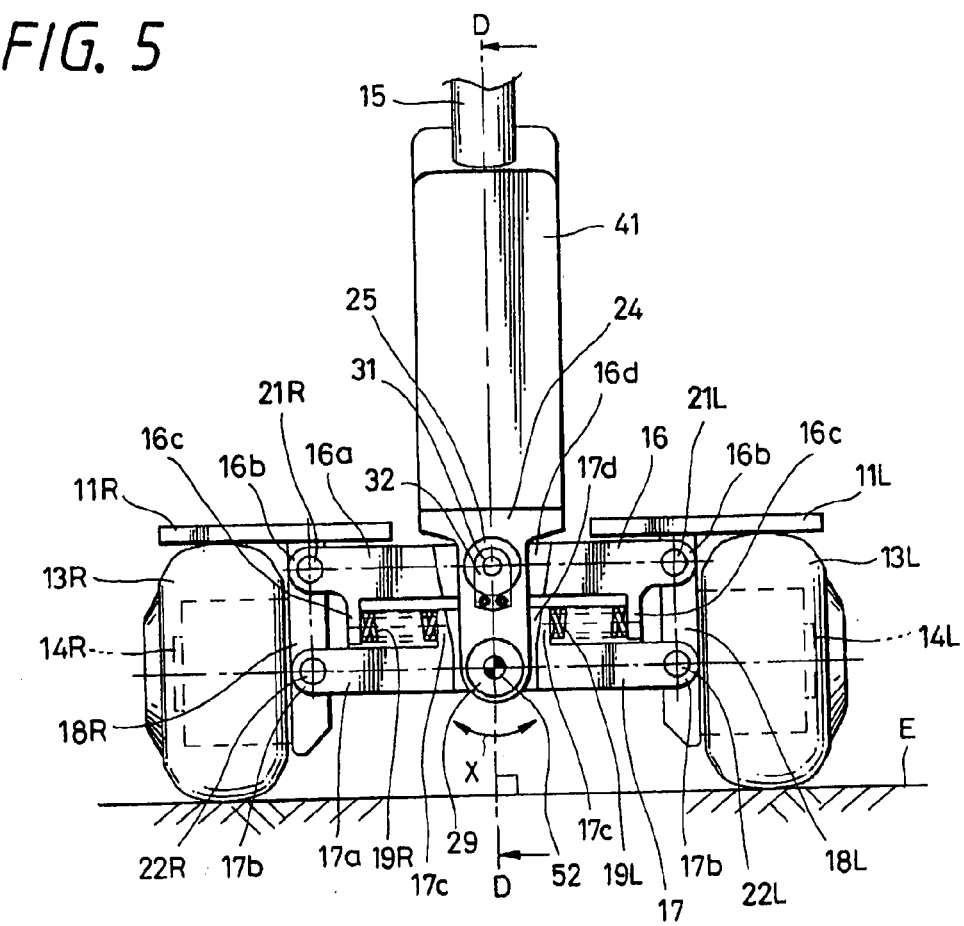
FIG. 5 is an explanatory diagram showing an enlarged relevant part of the coaxial two-wheel vehicle shown in FIG. 4A.
Figure 6:
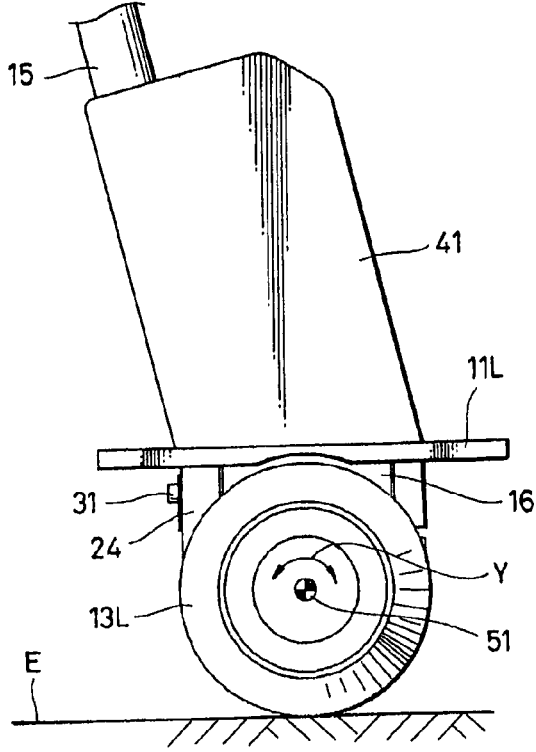
FIG. 6 is an explanatory diagram showing an enlarged relevant part of the coaxial two-wheel vehicle shown in FIG. 4B.
Figure 7:
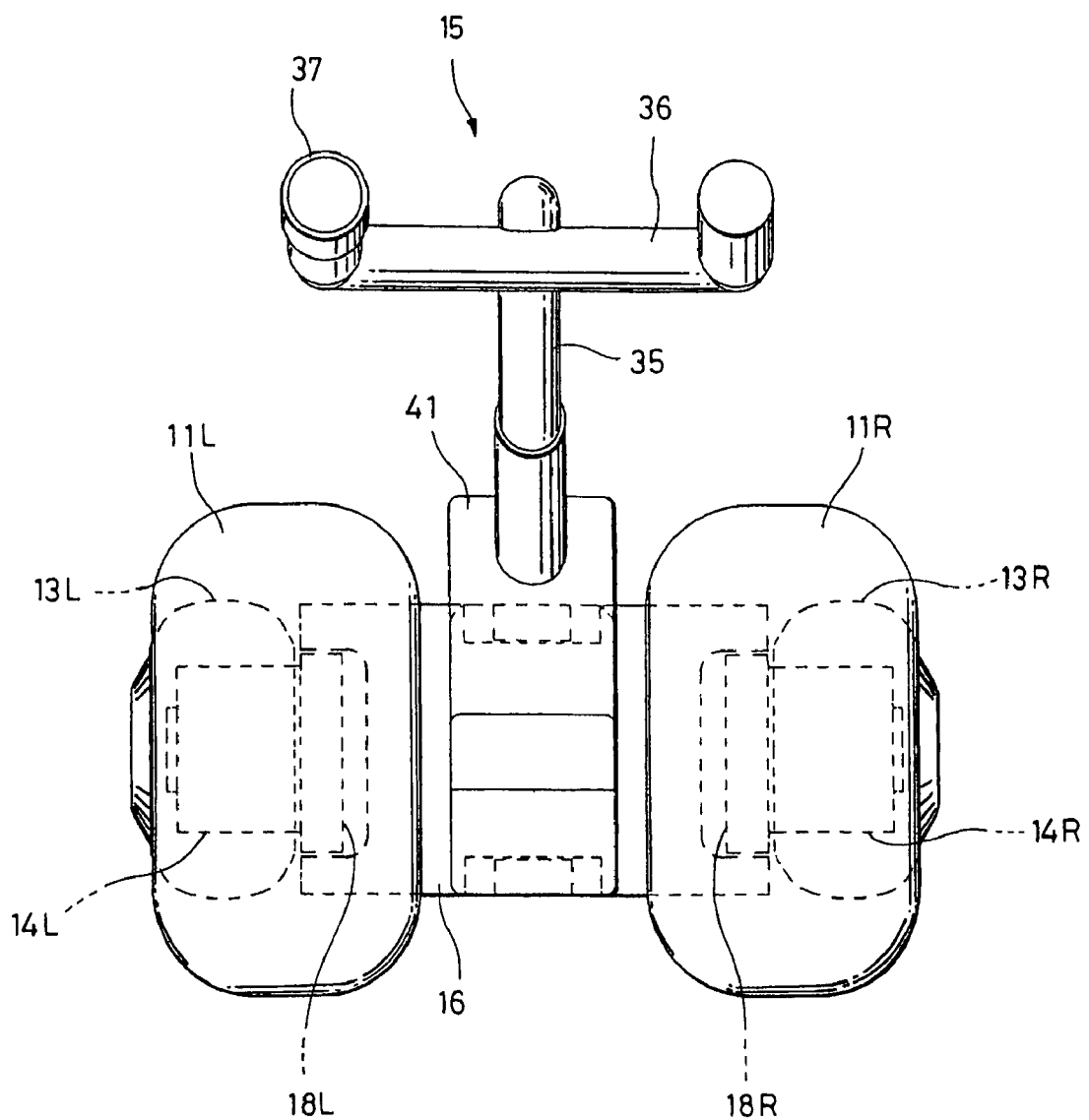
FIG. 7 is a plan view showing the coaxial two-wheel vehicle according to the first embodiment of the present invention.
Figure 8:
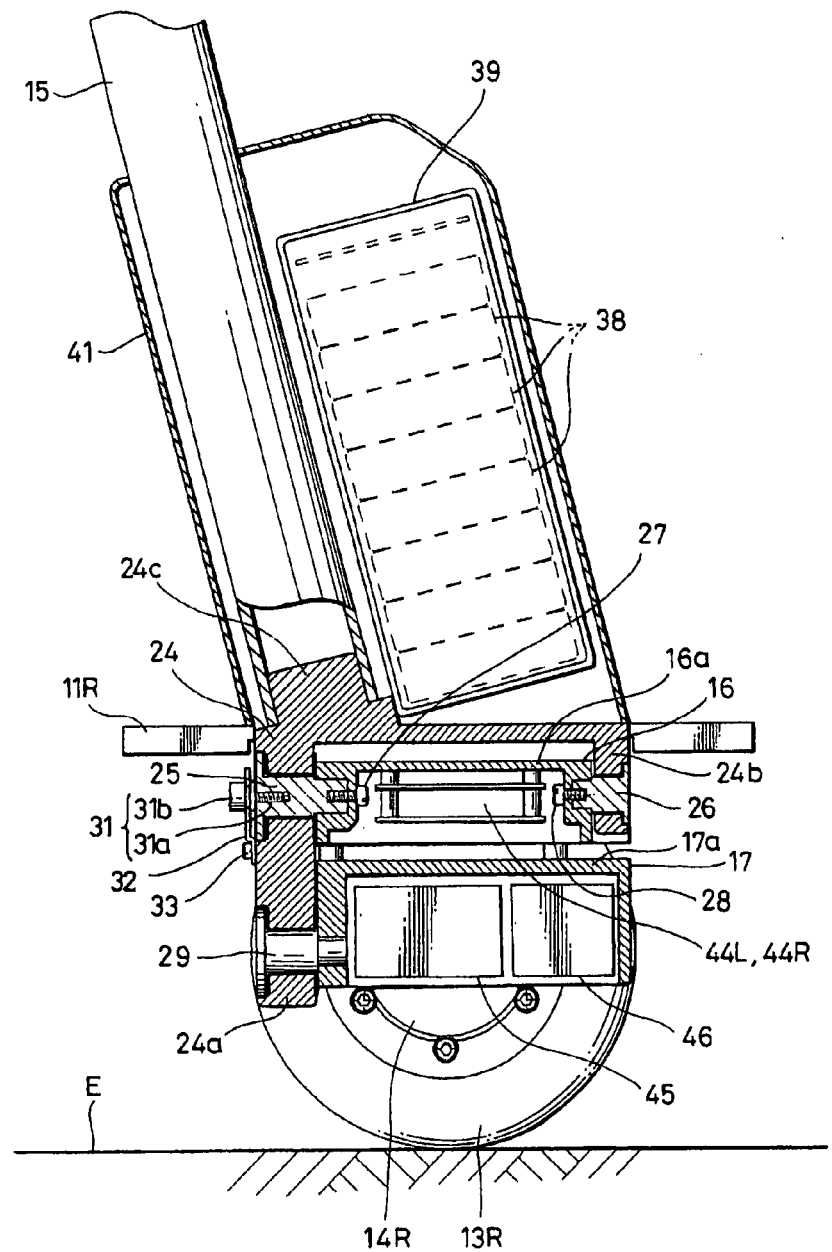
FIG. 8 is an enlarged cross-sectional diagram of a D-D line portion of the coaxial two-wheel vehicle shown in FIG. 5.
Figure 9:
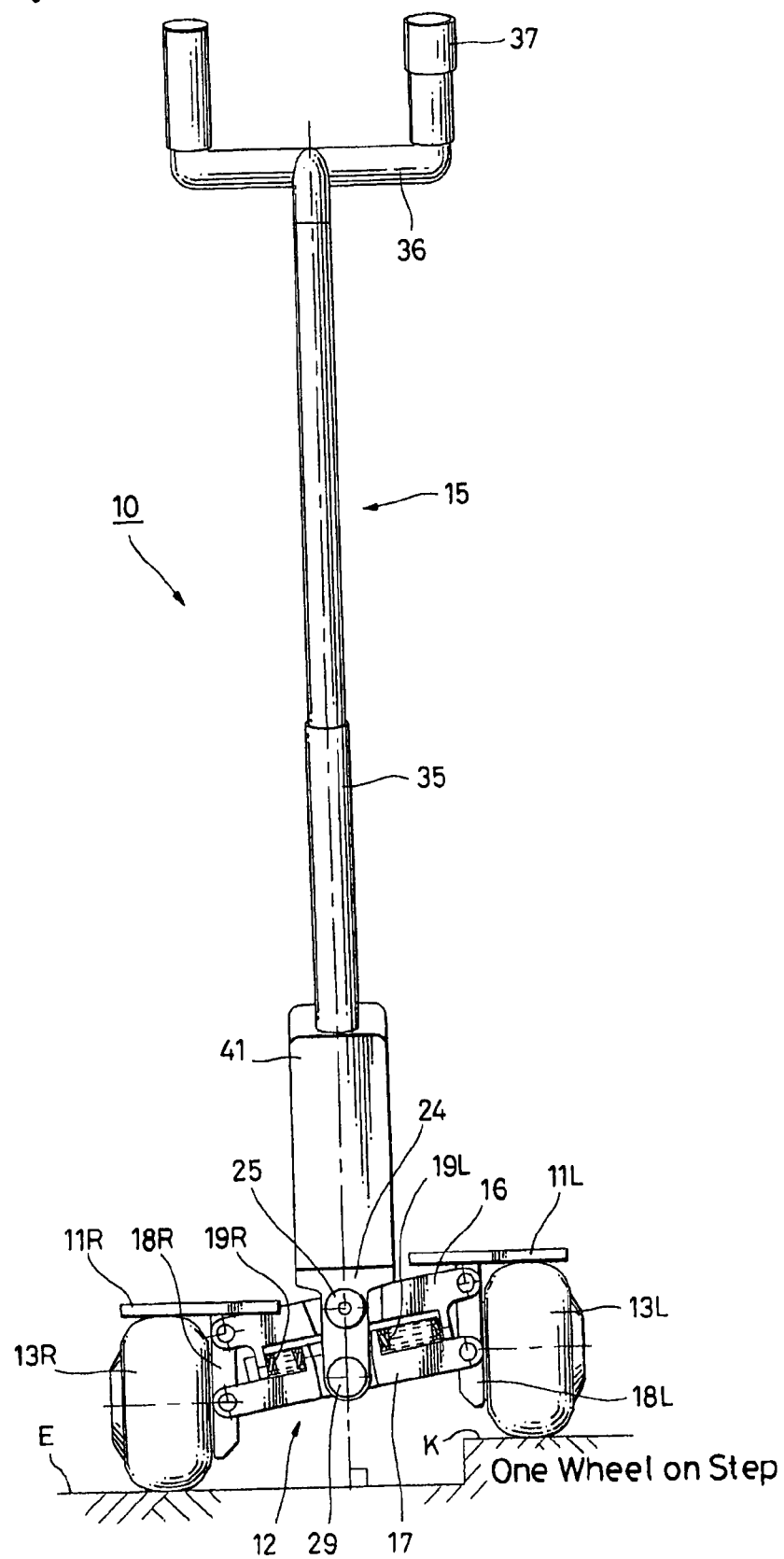
FIG. 9 is an explanatory diagram for explaining an operation of the coaxial two-wheel vehicle shown in FIG. 4A, showing a state in which one wheel runs on a step.
Figure 10:
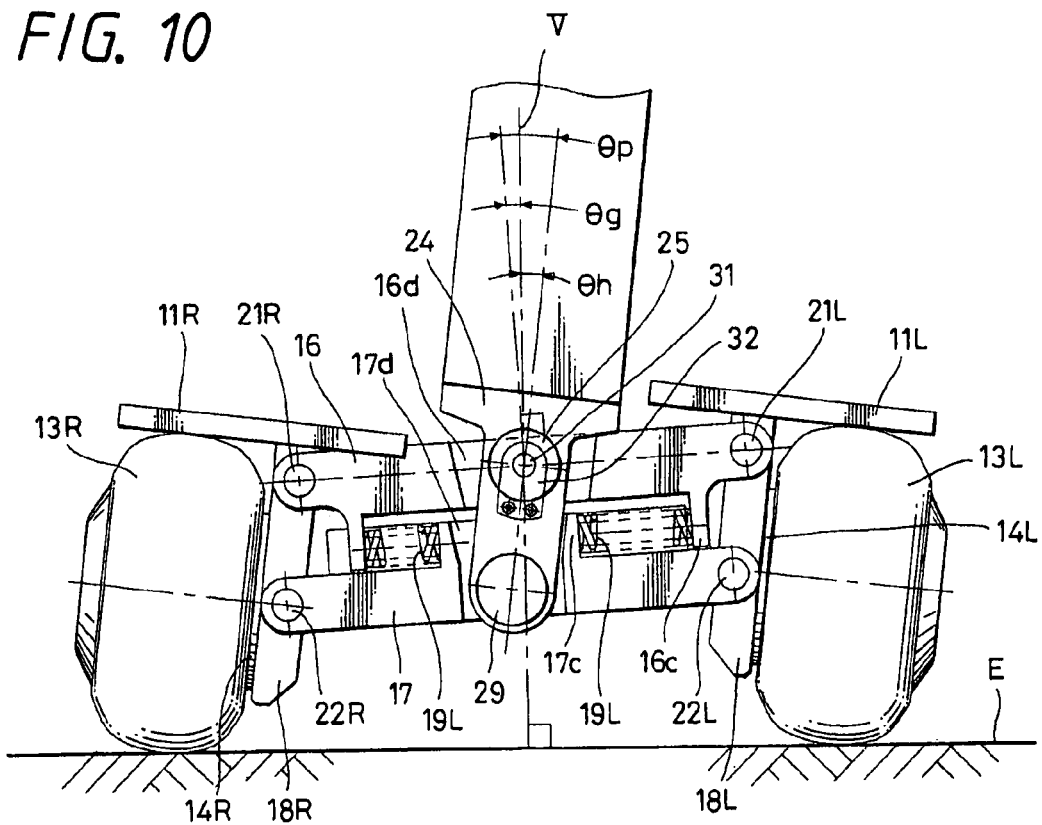
FIG. 10 is an explanatory diagram for explaining an operation of the coaxial two-wheel vehicle shown in FIG. 4A, showing a state of turning on a flat road surface.
Figure 11:
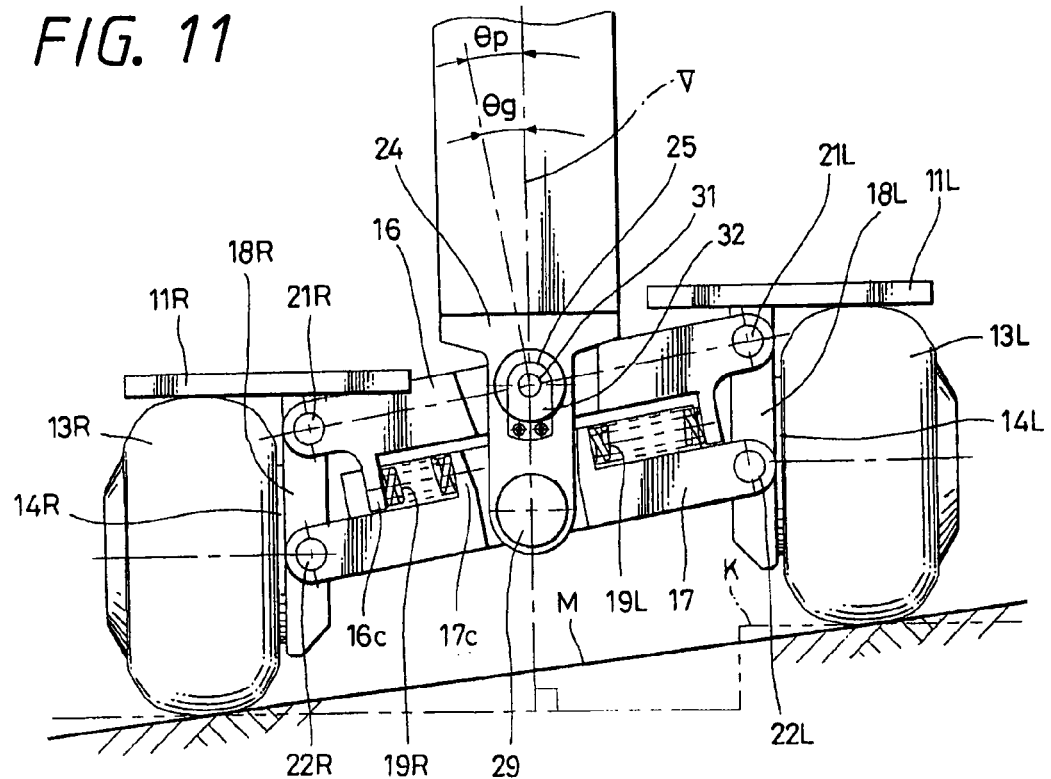
FIG. 11 is an explanatory diagram for explaining an operation of the coaxial two-wheel vehicle shown in FIG. 4A, showing a state of straight travel on a cant road surface.
Figure 12:
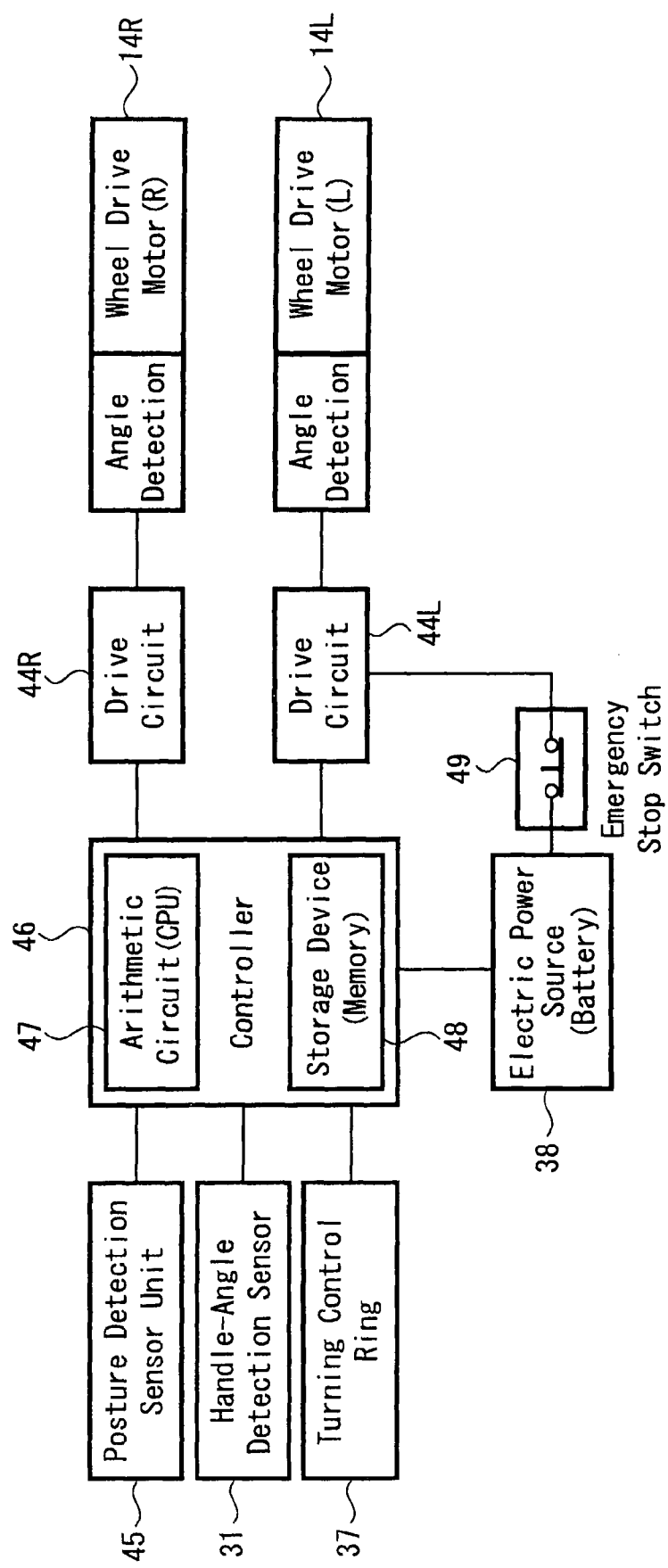
FIG. 12 is a block diagram showing a schematic configuration of a controller according to the first embodiment of the coaxial two-wheel vehicle of the present invention.
Figure 13A:
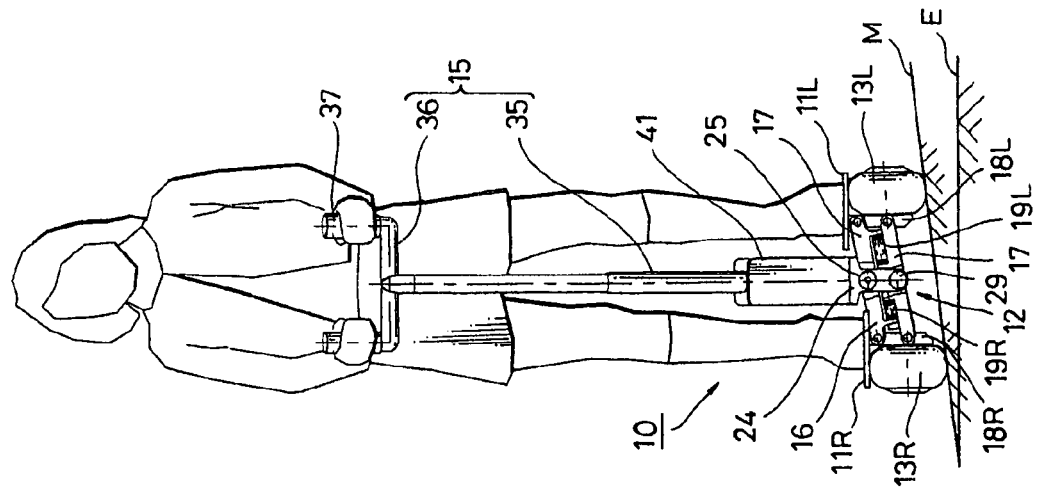
Figure 13B:
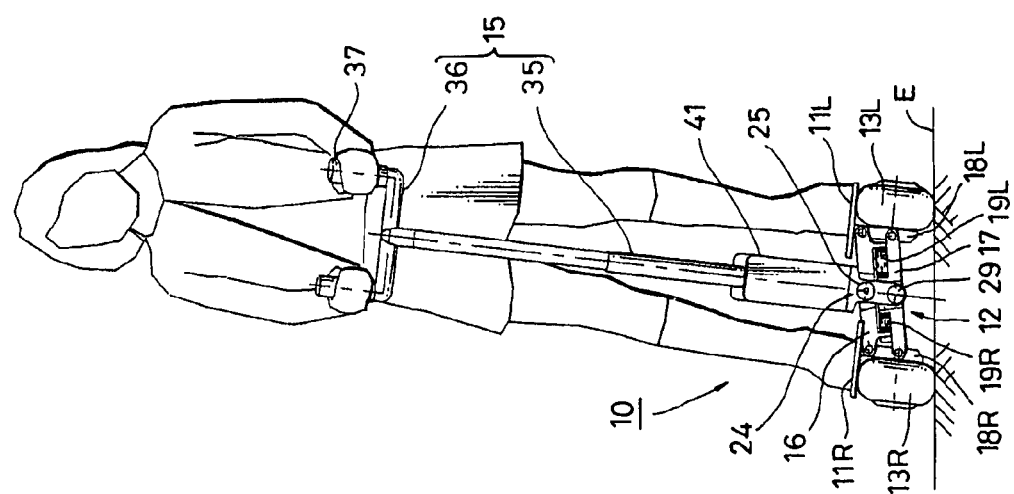
Figure 13C:
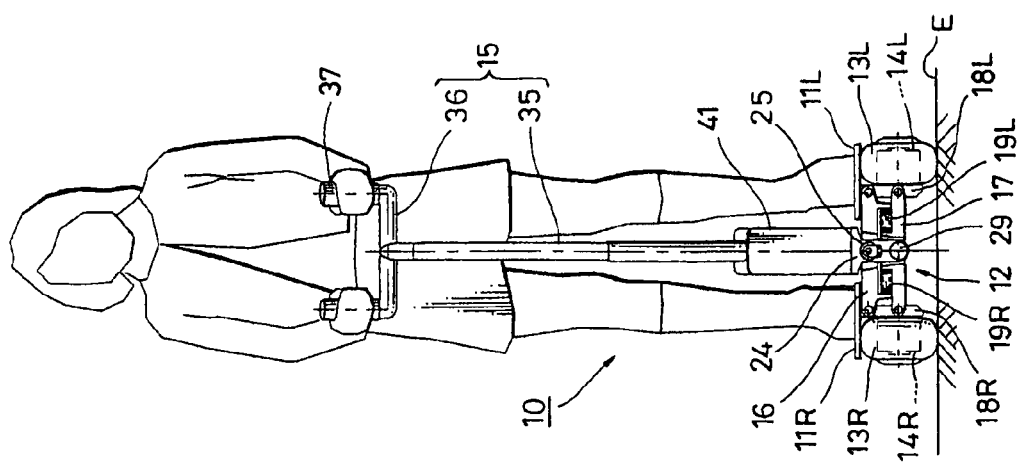

Hereinafter, embodiments of the present invention are explained by referring to the attached drawings. FIGS. 4 through 29 are diagrams for explaining embodiments of the present invention. Specifically, FIGS. 4A and 4B are a front view and a lateral view showing a coaxial two-wheel vehicle according to a first embodiment. FIG. 5 is an explanatory diagram showing an enlarged relevant part of FIG. 4A. FIG. 6 is an explanatory diagram showing an enlarged relevant part of FIG. 4B. FIG. 7 is a plan view thereof. FIG. 8 is a D-D line cross-sectional diagram of FIG. 5. FIG. 9 is a diagram for explaining an operation of the coaxial two-wheel vehicle according to the first embodiment. Similarly FIGS. 10 and 11 are explanatory diagrams of a relevant part for explaining an operation. FIG. 12 is a block diagram for explaining a circuit of a controller of the coaxial two-wheel vehicle according to the first embodiment. FIGS. 13A through 13C are explanatory diagrams showing a movement of a rider.

Figures 14A, 14B:
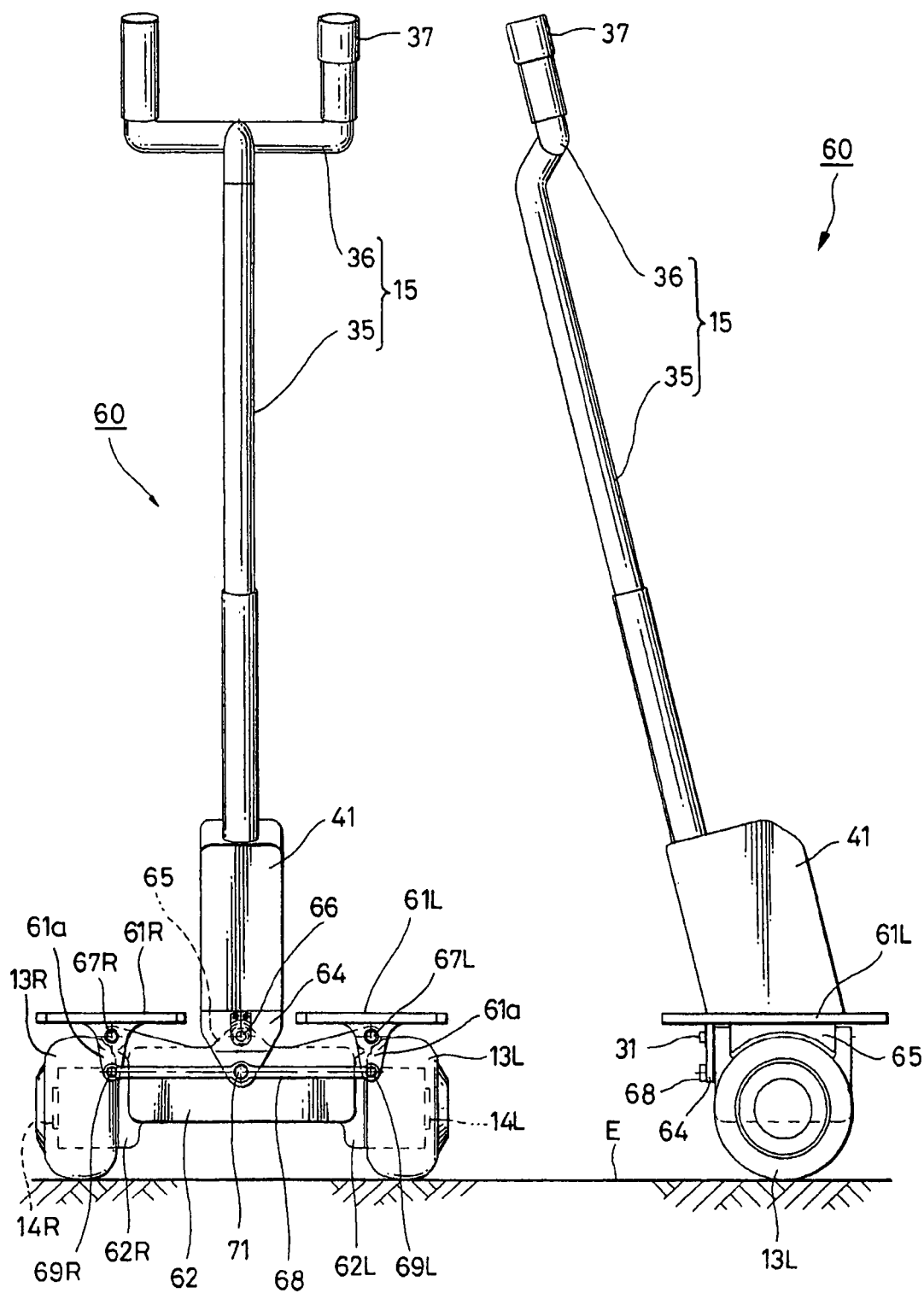
Figure 15A:
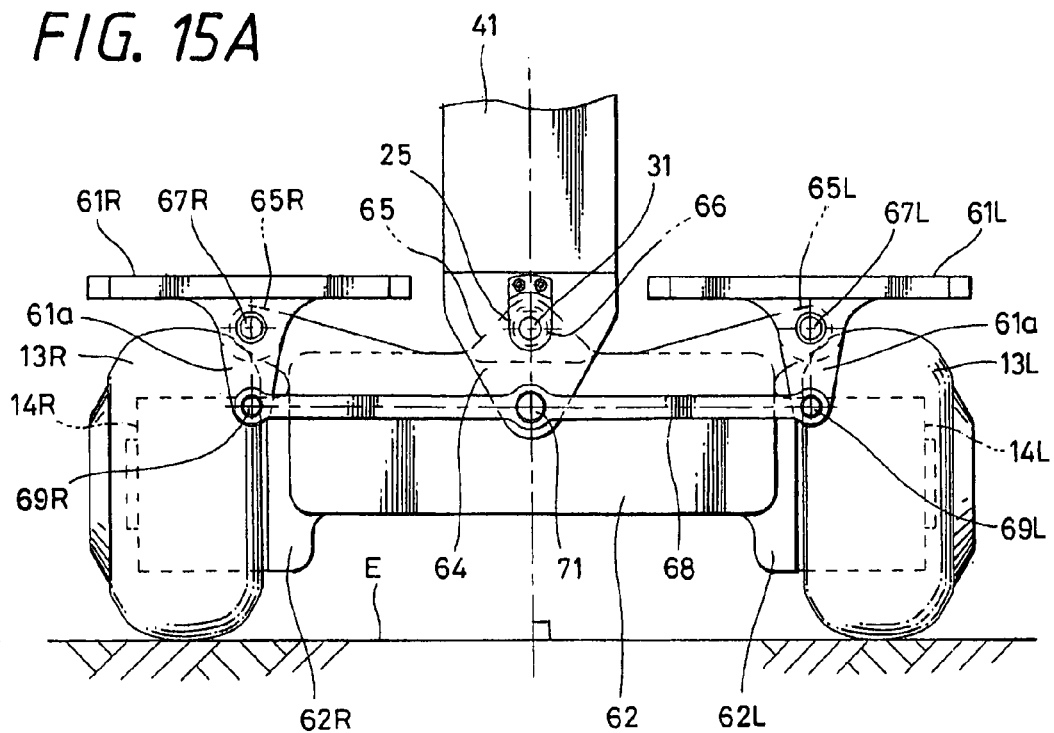
Figure 15B:
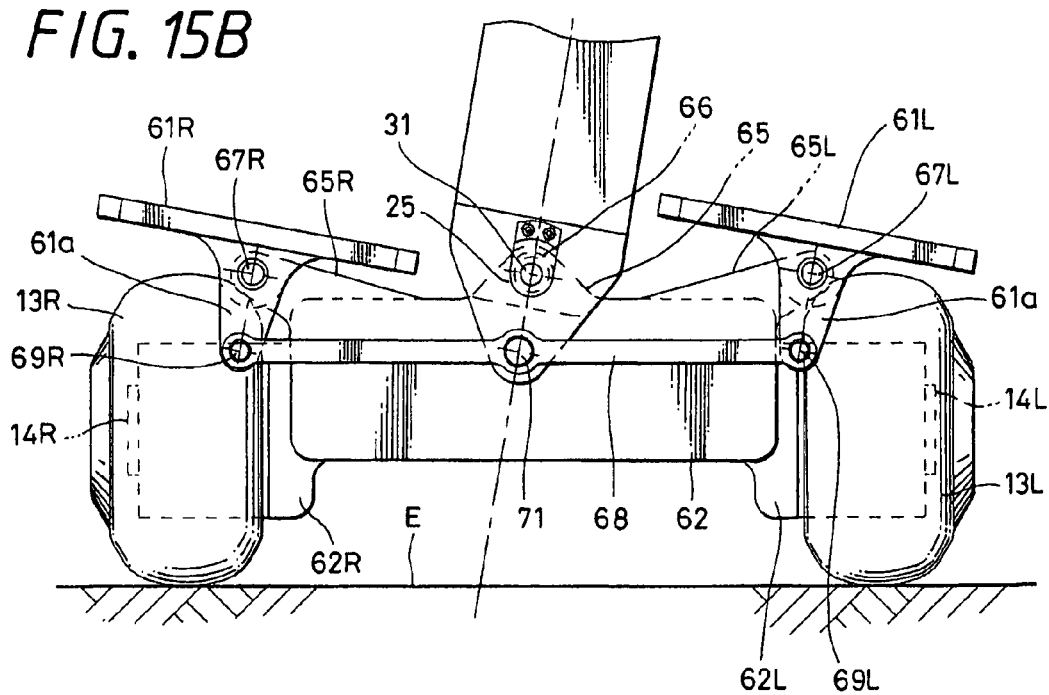
Figure 17A:
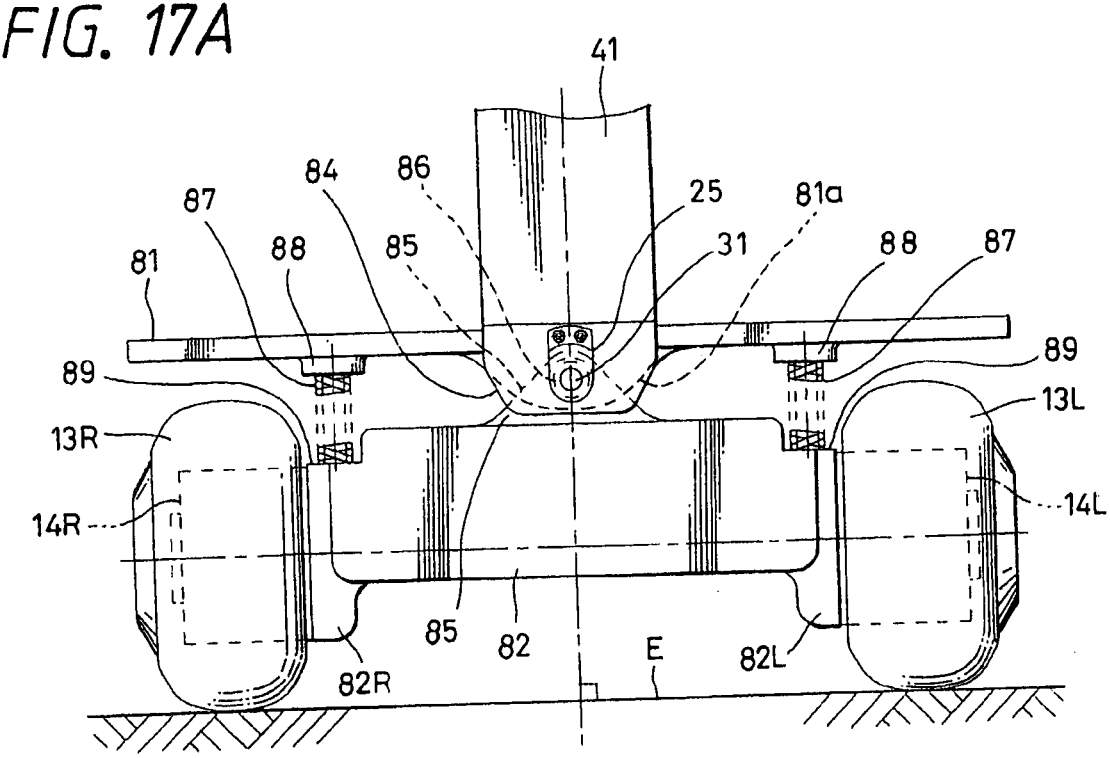
Figure 17B:
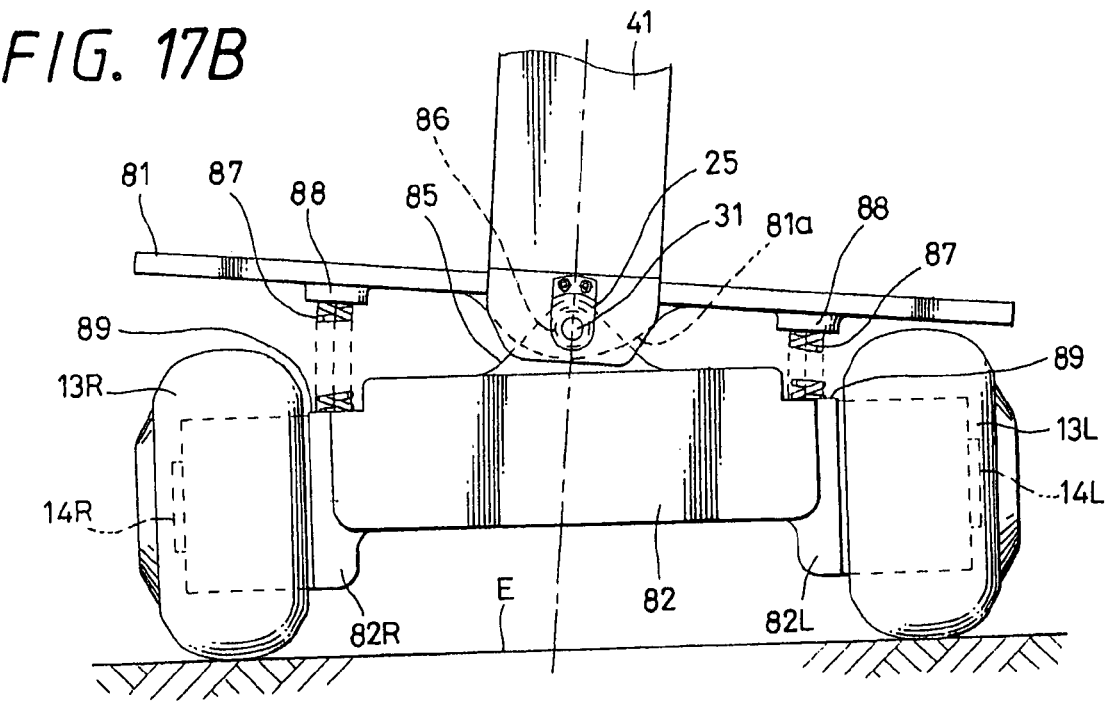
Figures 18A, 18B:
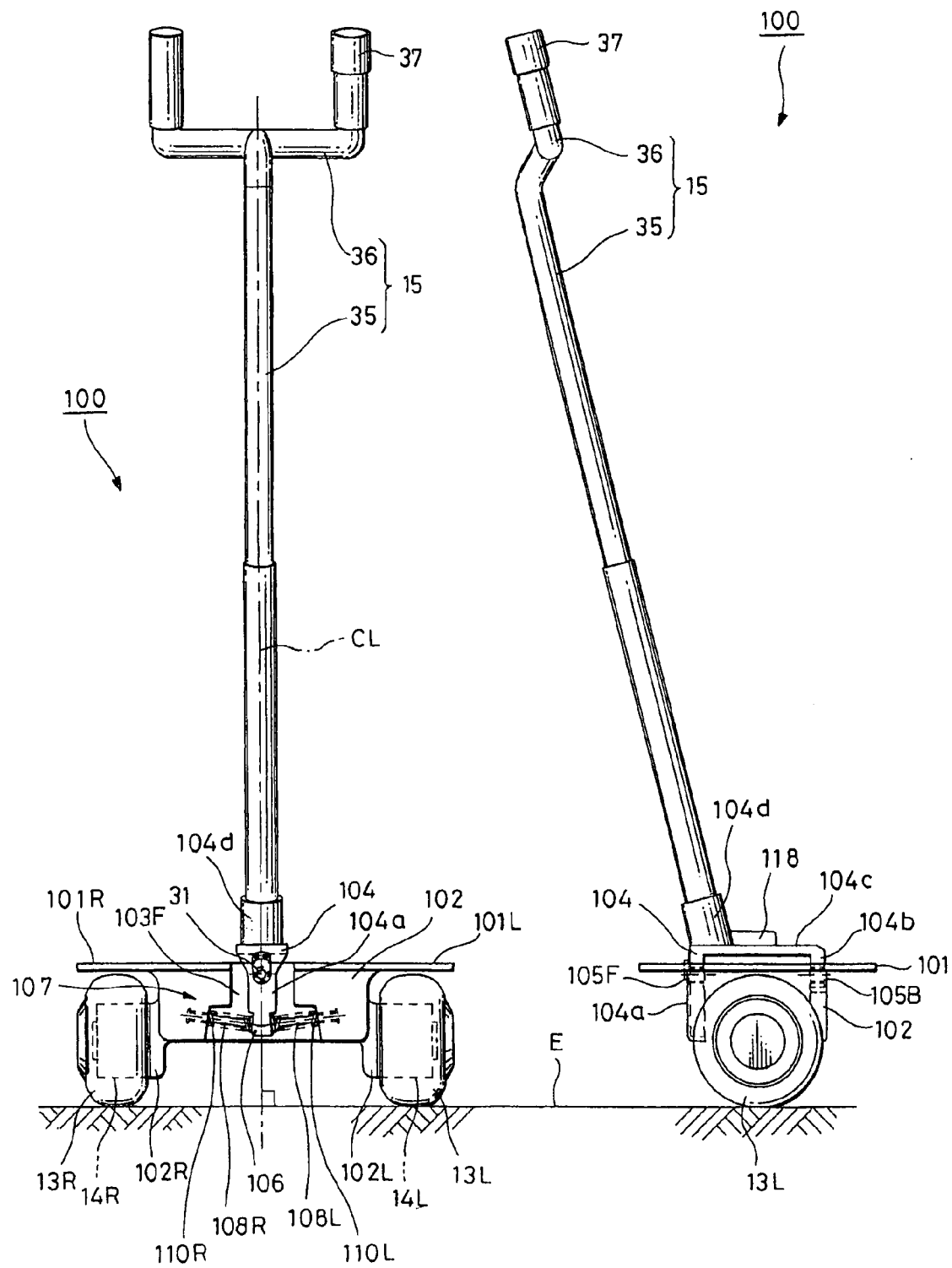
Figure 19A:
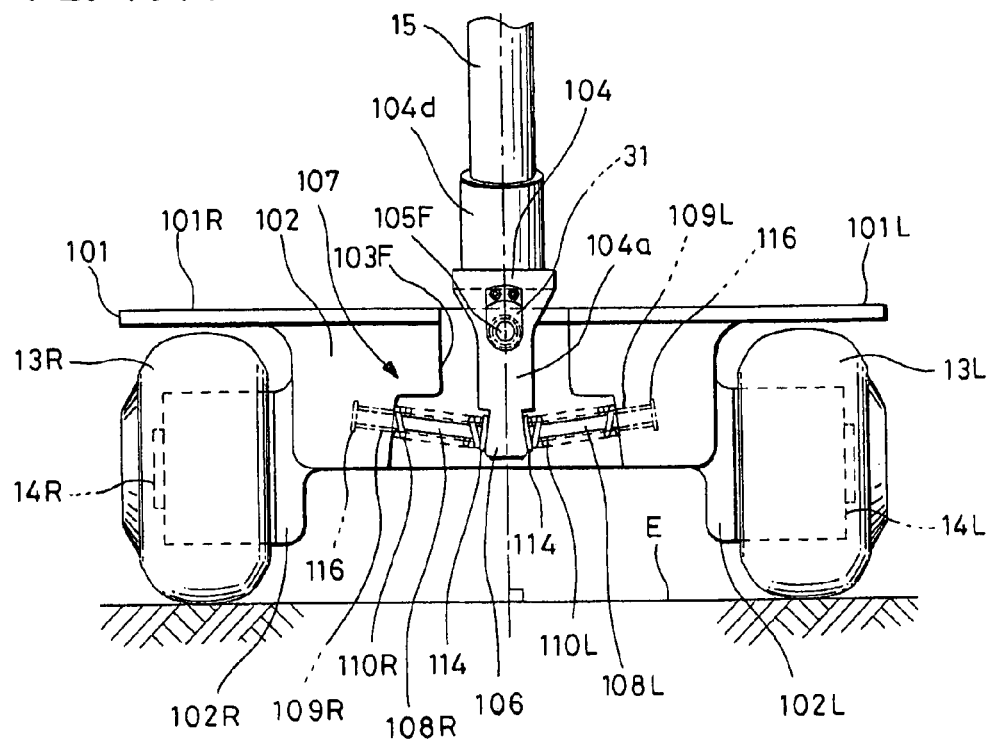
Figure 19B:
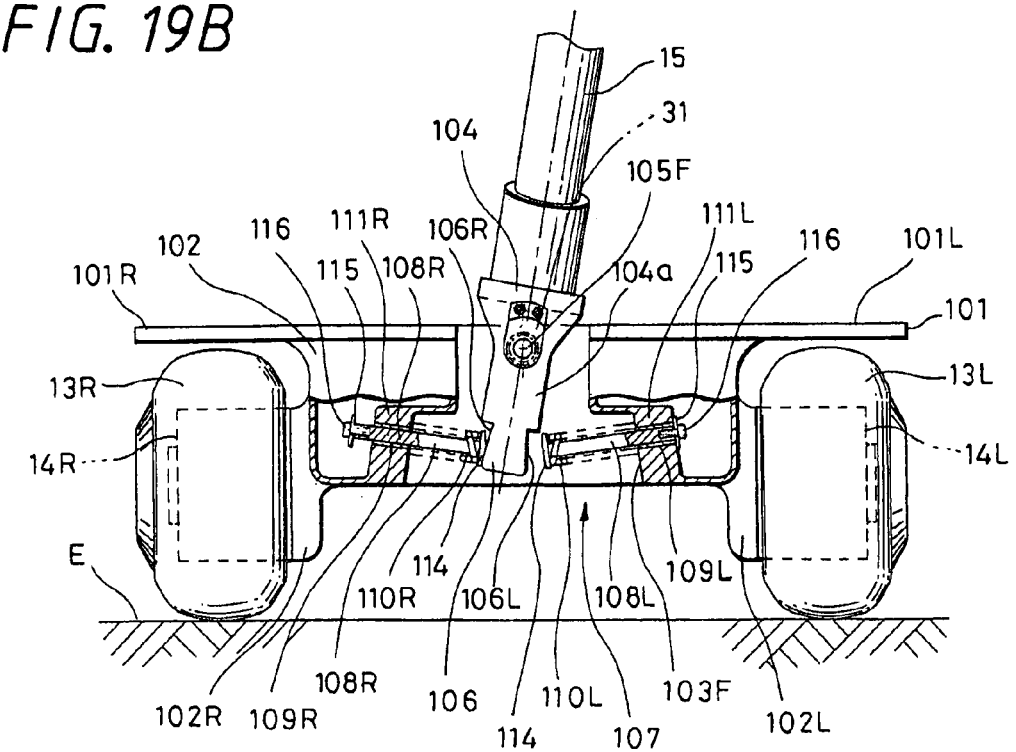
Figure 20:
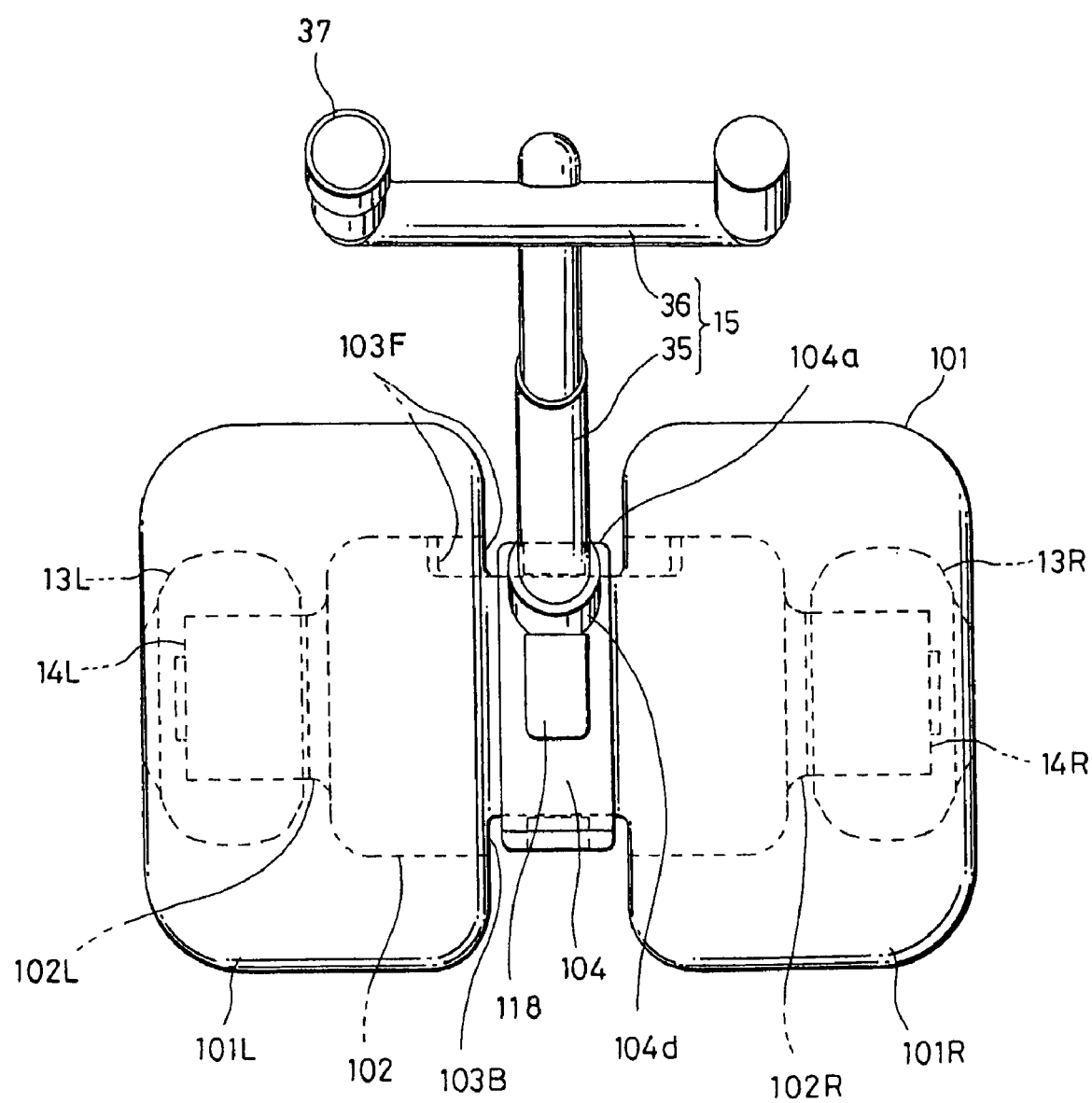
FIG. 20 is a plan view showing the coaxial two-wheel vehicle according to the fourth embodiment of the present invention.
Figure 21A:
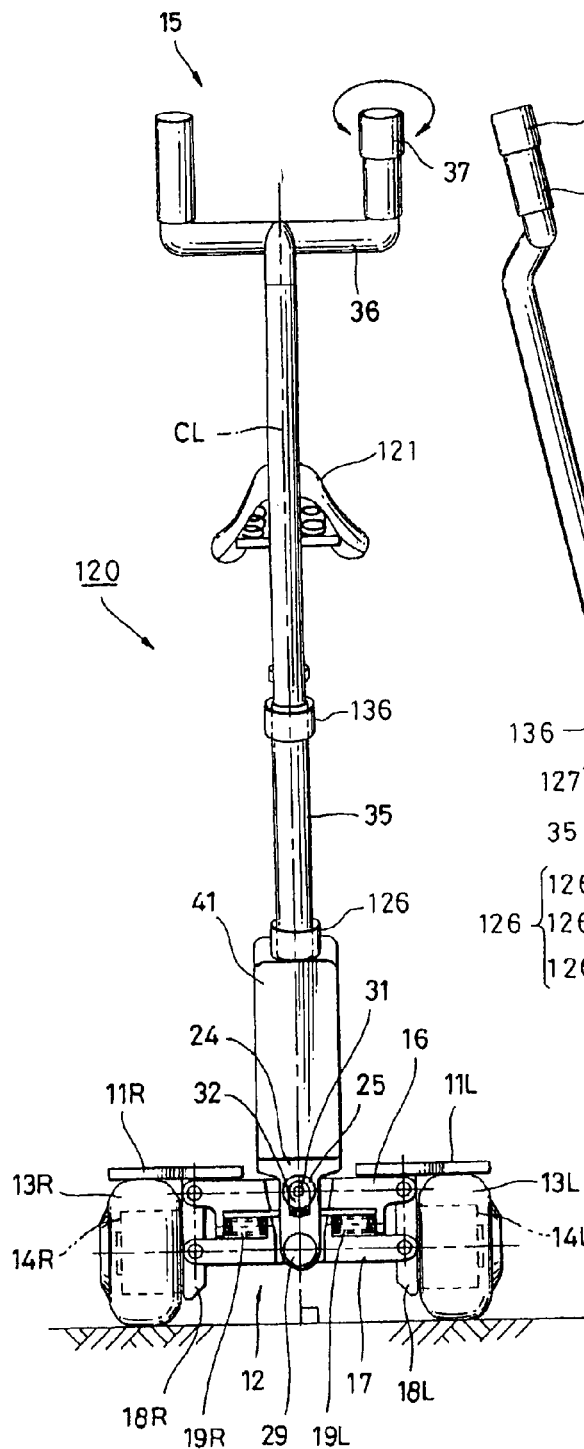
Figure 21B:
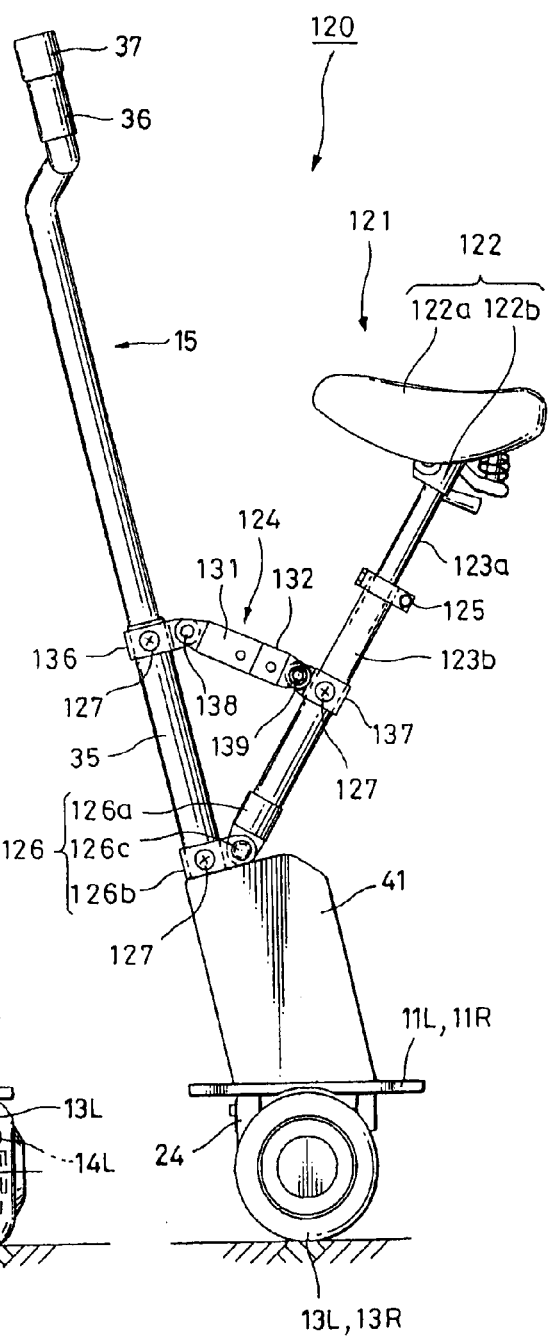
Figure 22A:
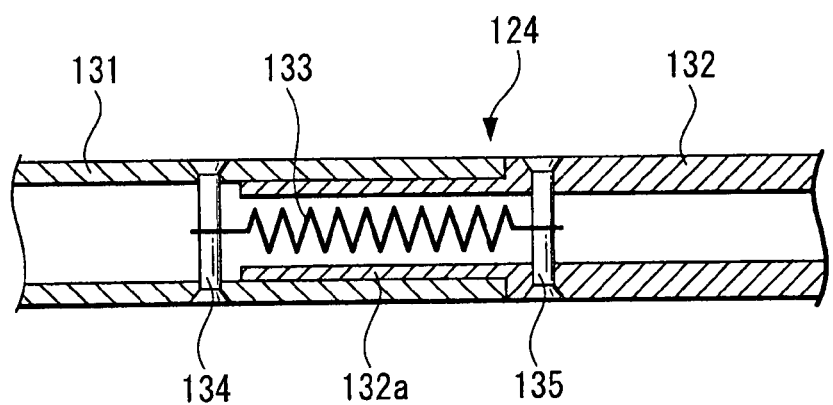
Figure 22B:
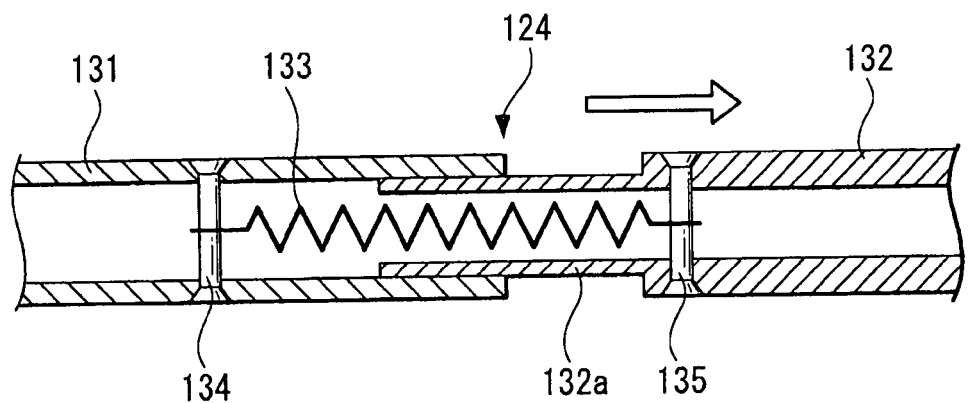

FIGS. 14A and 14B are a front view and a lateral view showing a coaxial two-wheel vehicle according to a second embodiment. FIGS. 15A and 15B are explanatory diagrams of a relevant part for explaining an operation of the coaxial two-wheel vehicle according to the second embodiment. FIGS. 16A and 16B are a front view and a lateral view showing a coaxial two-wheel vehicle according to a third embodiment. FIGS. 17A and 17B are explanatory diagrams of a relevant part for explaining an operation of the coaxial two-wheel vehicle according to the third embodiment. FIG. 18A and FIG. 18B are a front view and a lateral view showing a coaxial two-wheel vehicle according to a fourth embodiment. FIGS. 19A and 19B are explanatory diagrams of a relevant part for explaining an operation of the coaxial two-wheel vehicle according to the fourth embodiment. FIG. 20 is a plan view. FIGS. 21A and 21B are a front view and a lateral view showing a coaxial two-wheel vehicle according to a fifth embodiment. FIGS. 22A and 22B are explanatory diagrams of a support link according to the fifth embodiment.

Figure 23:
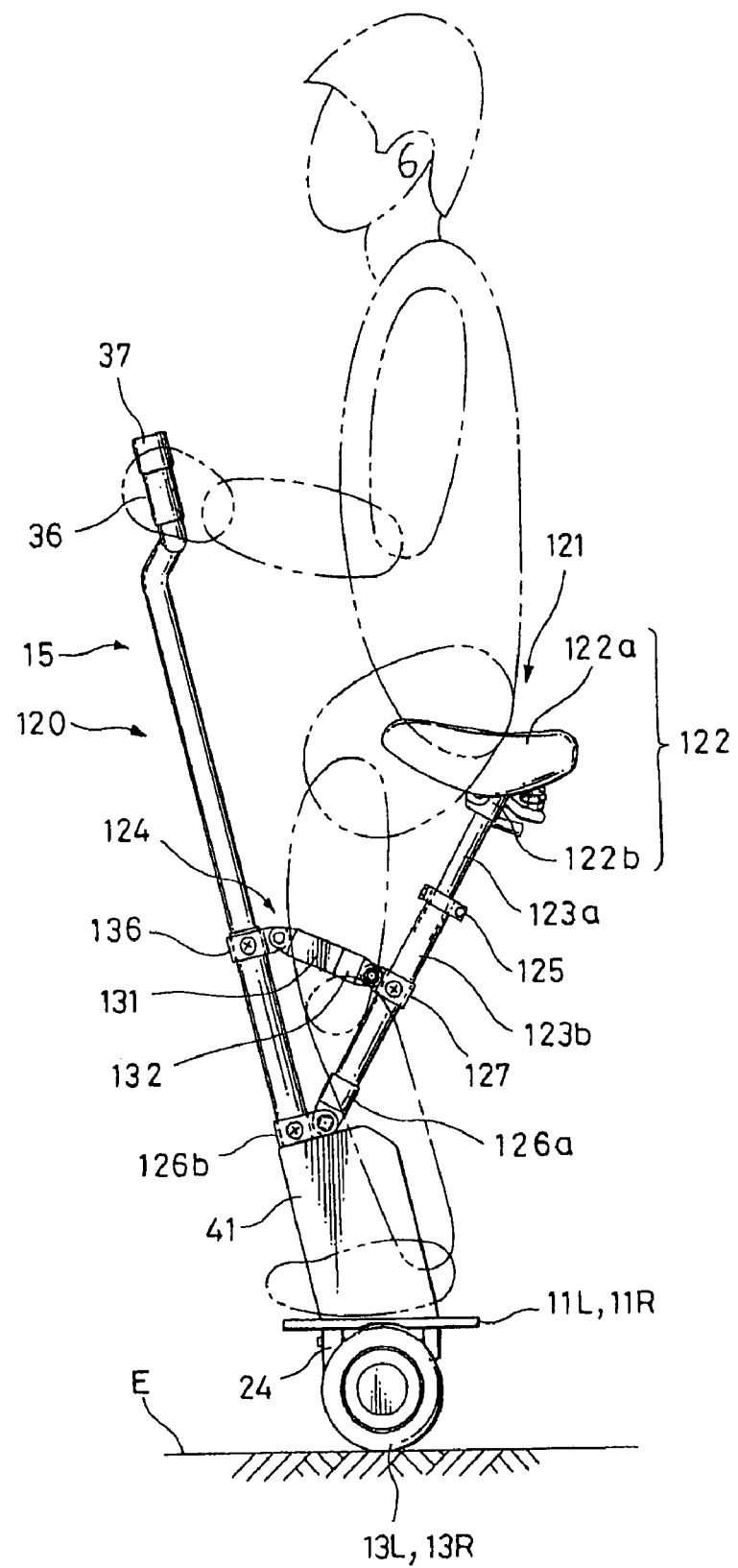
FIG. 23 is an explanatory diagram showing a state of use of the coaxial two-wheel vehicle according to the fifth embodiment of the present invention.
Figure 24:
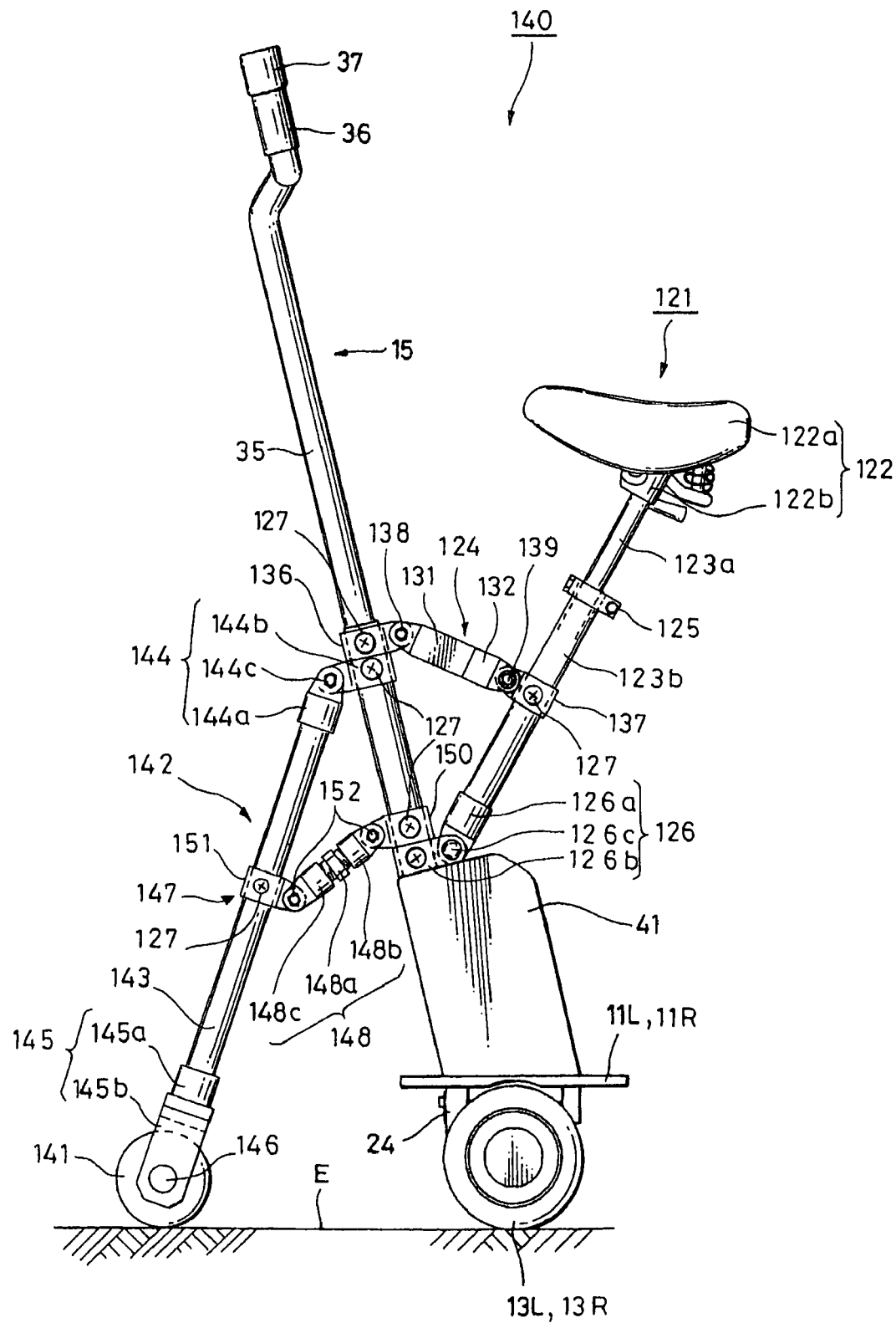
FIG. 24 is a lateral view showing a coaxial two-wheel vehicle according to a sixth embodiment of the present invention.
Figure 25:
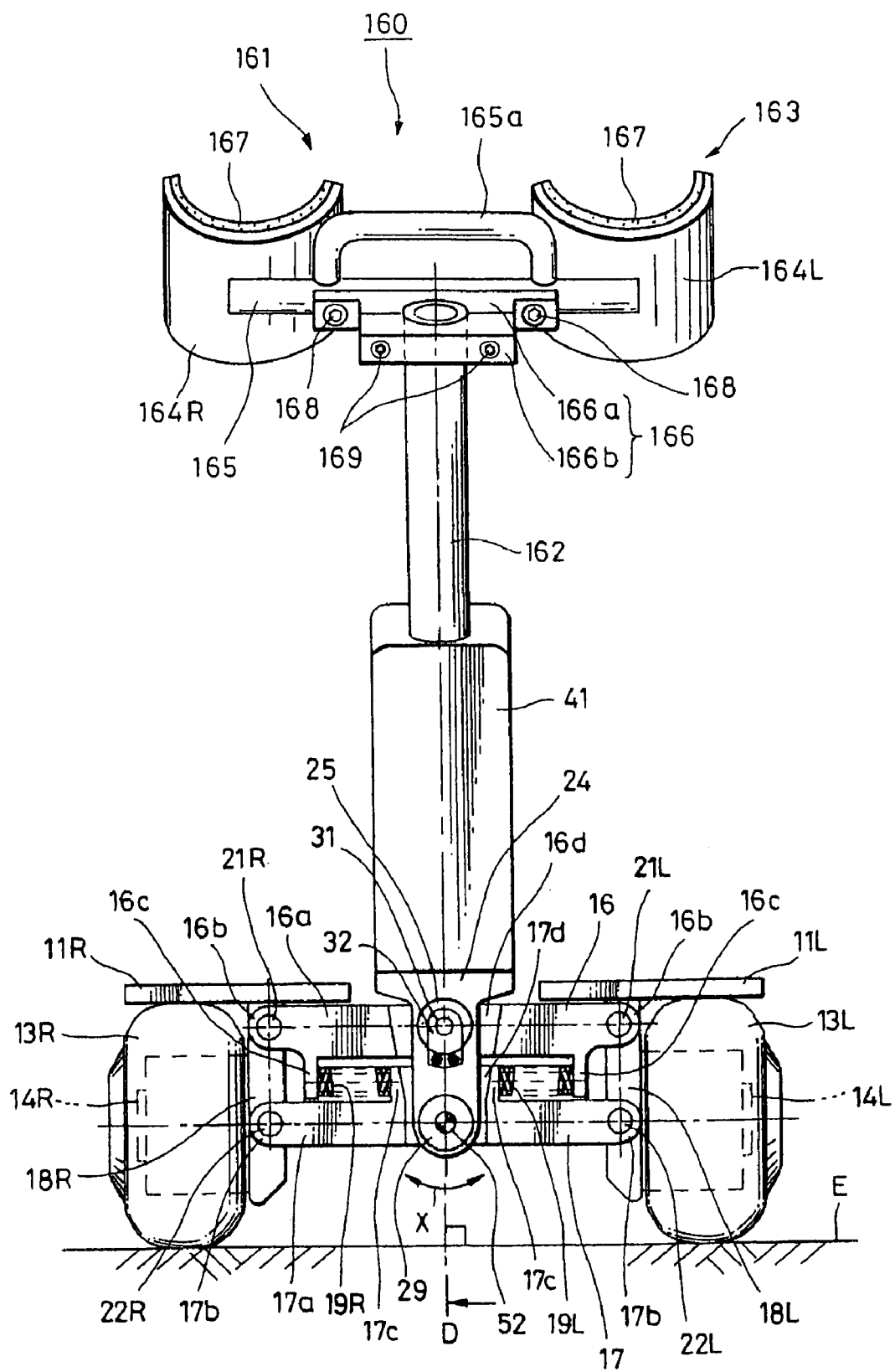
FIG. 25 is a front view showing a coaxial two-wheel vehicle according to a seventh embodiment of the present invention.
Figure 26:
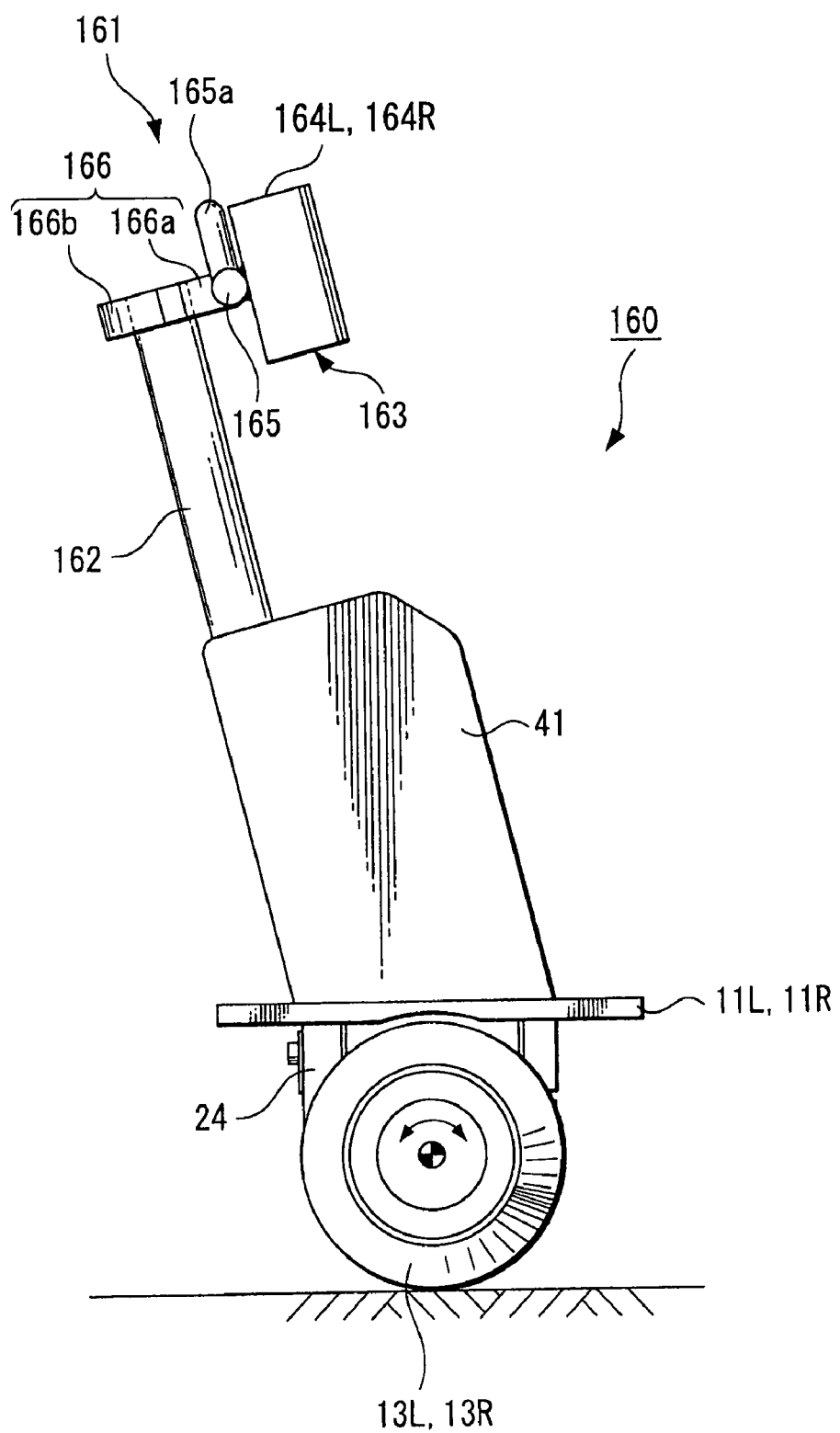
FIG. 26 is a lateral view showing the coaxial two-wheel vehicle according to the seventh embodiment of the present invention.
Figure 27:
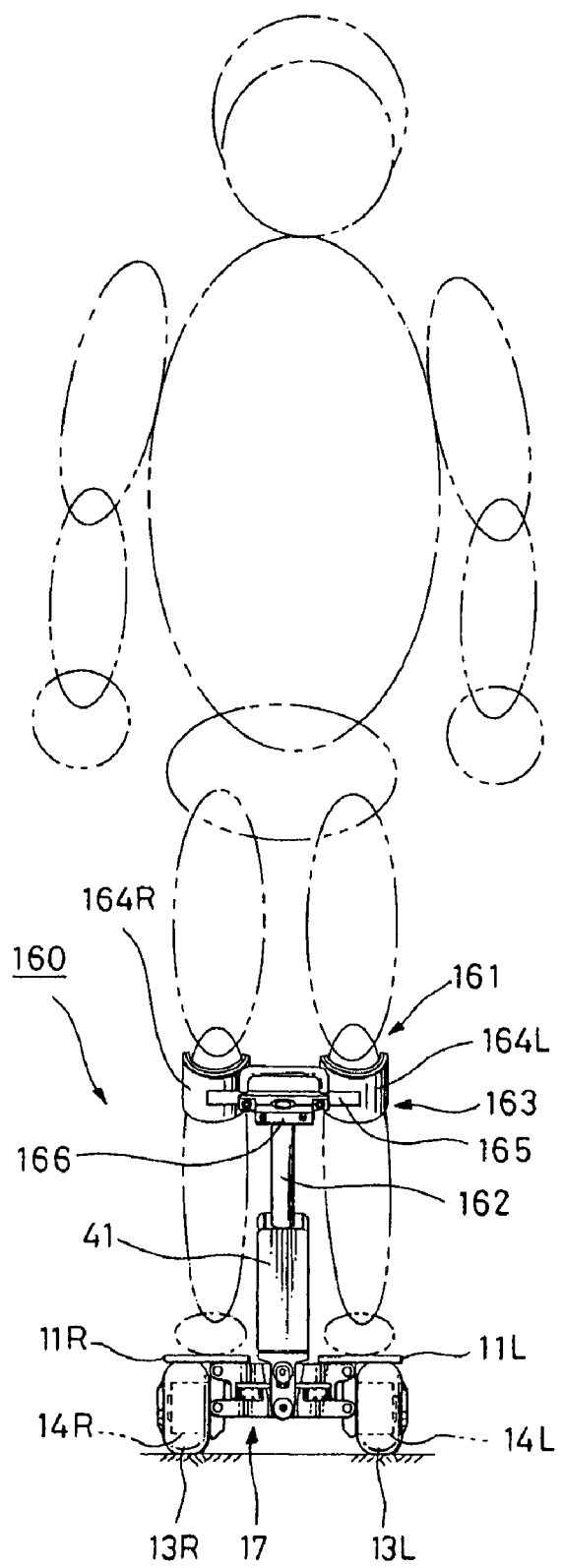
FIG. 27 is an explanatory diagram showing a state of use of the coaxial two-wheel vehicle according to the seventh embodiment of the present invention.
Figure 29A:
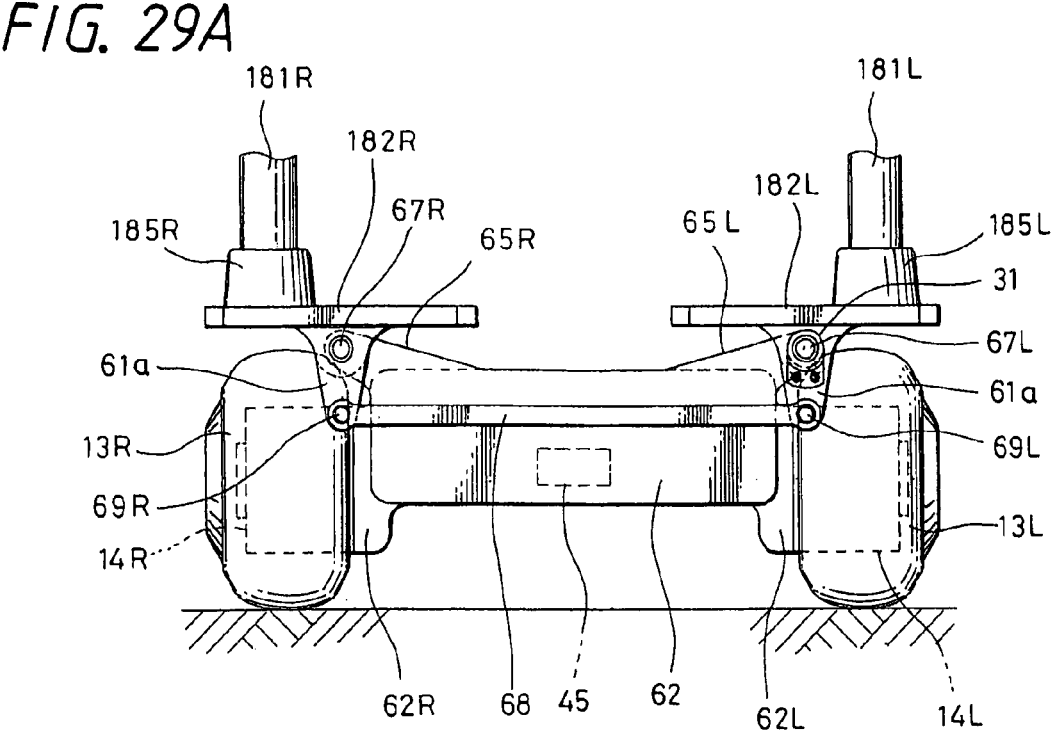
Figure 29B:
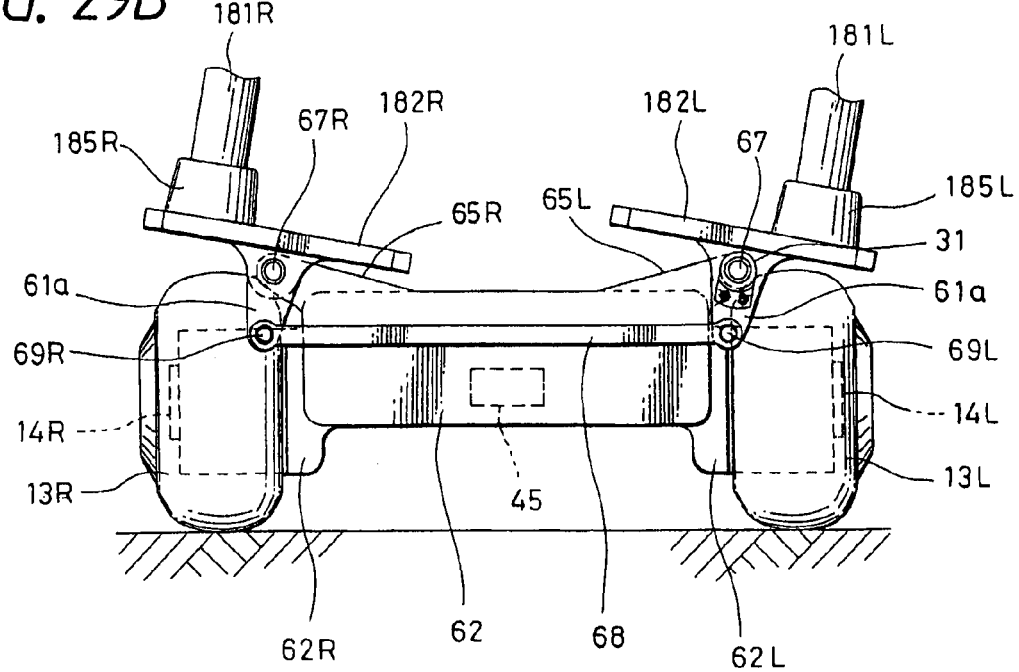

Further, FIG. 23 is a diagram for explaining an operation of the coaxial two-wheel vehicle according to the fifth embodiment. FIG. 24 is a lateral view showing a coaxial two-wheel vehicle according to a sixth embodiment. FIG. 25 is a front view showing a coaxial two-wheel vehicle according to a seventh embodiment. FIG. 26 is a lateral view thereof. FIG. 27 is an explanatory diagram showing a state of use thereof. FIGS. 28A and 28B are a front view and a lateral view showing a coaxial two-wheel vehicle according to an eighth embodiment. FIGS. 29A and 29B are explanatory diagrams of a relevant part to explain an operation of the coaxial two-wheel vehicle according to the eighth embodiment.

As shown in FIGS. 4A, 4B, 5, 6 and 7, a coaxial two-wheel vehicle 10 that is a first embodiment of the present invention includes two divided steps 11L and 11R, a vehicle body 12, a pair of wheels 13L and 13R, a pair of wheel drive units 14L and 14R, a handle 15 and the like. The divided steps 11L and 11R are a specific example of a step plate for a rider to ride on.

The vehicle body supports those divided steps 11L and 11R respectively to be capable of changing a posture in a roll direction X. The pair of wheels 13L and 13R are rotatably supported by the vehicle body 12. The pair of wheel drive units 14L and 14R are a specific example of wheel drivers which drive and rotate the pair of wheels 13L and 13R. The handle 15 is a first specific example of a control lever to change a posture of the two divided steps 11L and 11R indirectly through the vehicle body 12.

The two divided steps 11L and 11R are steps for a rider to ride by placing one foot on each of the steps and are made of a pair of flat boards formed with a size equivalent to or a little larger than a human foot. The vehicle body 12 has a parallel link mechanism in which a vehicle body upper member 16 and a vehicle body lower member 17 are disposed above and below in parallel with each other, and a pair of lateral members 18L and 18R are disposed left and right in parallel with each other, being connected to the vehicle body upper member 16 and the vehicle body lower member 17 in a turnable manner. Between the vehicle body upper member 16 and the vehicle body lower member 17 of this parallel link mechanism are provided a pair of coil springs 19L and 19R. The coil springs 19L and 19R are a first specific example of an elastic member generating spring force maintaining the angle formed by the vehicle body upper member 16 and the vehicle body lower member 17 and the pair of lateral members 18L and 18R to be orthogonal.

Showing as enlarged views in FIGS. 5 through 8, the vehicle body upper member 16 and the vehicle body lower member 17 are configured to have the following portions. Specifically, approximately quadrangular chassis portions 16a and 17a whose lower sides are open respectively, bearing portions 16b and 17b at four positions formed to project in the lengthwise direction at four corners of each of chassis portions 16a and 17a, and a pair of spring bearing portions 16c, 16c and 17c, 17c each of which is formed to project to the side of the other member, respectively. Lengths in the left and right direction that is the vehicle width direction of the vehicle body upper member 16 and the vehicle body lower member 17 are set to the same length, and the bearing portions 16b and 17b of four positions provided at the respective corner portions are provided at positions to be mutually overlapped when the both members 16 and 17 are overlapped.

In the vehicle body upper member 16 are provided bearing holes at three positions respectively in the middle and at the both ends in a lengthwise direction that is the left and right direction (six positions in total on both front and rear sides). Also, in the vehicle body lower member 17 are provided bearing holes at three positions respectively in the middle and at both ends in a lengthwise direction that is the left and right direction (on the rear side two positions at both ends, and so five positions in total). The bearing holes of end portion at the both ends of the vehicle body upper member 16 and those at the both ends of the vehicle body lower member 17 are set at the same intervals to correspond to each other, and the pair of lateral members 18L and 18R are provided between the left and right bearing portions 16b, 16b and 17b, 17b that have those bearing holes at the end portions.

The pair of lateral members 18L and 18R are made of members in flat-plate shape having such width that slidably fit between the pair of bearing portions 16b, 16b disposed in the front and rear direction of the vehicle body upper member 16 and the pair of bearing portions 17b, 17b disposed in the front and rear direction of the vehicle body lower member 17. The pair of lateral members are disposed on both left and right sides of the vehicle body upper member 16 and the vehicle body lower member 17 with plane portions thereof extending upward and downward. Further, bearing holes corresponding to the pair of bearing holes of the vehicle body upper member 16 and corresponding to the pair of bearing holes of the vehicle body lower member 17 are provided at four positions on both sides of each of the lateral members 18L and 18R.

Into four bearing holes positioned in the upper portion among the eight bearing holes of the pair of lateral members 18L and 18R, upper turning support pins 21L and 21R penetrating through the bearing holes of the bearing portions 16b provided at the four positions of the vehicle body upper member 16 are attached by fitting in a turnable manner, respectively. Similarly, into four bearing holes positioned in the lower portion among the eight bearing holes of the pair of lateral members 18L and 18R, lower turning support pins 22L and 22R penetrating through the bearing holes of the bearing portions 17b provided at the four positions of the vehicle body lower member 17 are attached by fitting in a turnable manner respectively. Accordingly, the parallel link mechanism is formed by the vehicle body upper member 16, the vehicle body lower member 17, and the left and right lateral members 18L and 18R.

The wheel drive units 14L and 14R are each attached to the outer surface of the pair of lateral members 18L and 18R, respectively. Each of the wheel drive units 14L and 14R may include an electric motor, a reduction gear row connected to a rotary shaft of the electric motor to be capable of transmitting power and the like, for example. The wheel drive units 14L and 14R are each configured to have a fixed portion that is fixed to the lateral members 18L, 18R respectively and a rotatable portion supported by the fixed portion in a freely rotatable manner. The pair of wheels 13L and 13R are attached to the rotatable portion, respectively. Thus, the pair of wheels 13L and 13R supported by the pair of lateral members 18L and 18R through the pair of wheel drive units 14L and 14R have the center of rotation corresponding with each other on the same axis center line when being positioned on a flat road surface.

Further, upper end portions of the pair of lateral members 18L and 18R are projected appropriately upward from the upper surface of the vehicle upper member 16, and the above-described divided steps 11L and 11R are individually attached to the upper end surfaces thereof. The pair of divided steps 11L and 11R are provided horizontally extending at the same height with a predetermined gap in between in the left and right direction that is a wheel axle direction. The distance between the pair of divided steps 11L and 11R is made to be a distance between both feet when a person is standing in a natural state.

The pair of spring bearing portions 17c, 17c of the vehicle body lower member 17 are provided in the center portion with a predetermined gap in between in the left and right direction. The pair of spring bearing portions 16c, 16c of the vehicle body upper member 16 are provided at positions corresponding to the pair of spring bearing portions 17c, 17c. Further, the coil springs 19L and 19R having appropriate spring force are mounted in a state adequately compressed between the spring bearing portions 16c and 17c corresponding to each other. Here, though not shown in the figure, it is preferable to provide each of the spring bearing portions 16c and 17c with a spring bearing projection to support each end of the coil springs 19L and 19R so that the coil springs 19L and 19R are prevented from dropping off.

Further, as shown in FIG. 8, a control lever bracket 24 is attached to the center portion in the left and right direction of the vehicle body upper member 16 and the vehicle body lower member 17. The control lever bracket 24 is made of a saddle-shaped member formed to straddle the vehicle body upper member 16 in the front and rear direction, a front surface portion 24a extending to the lower portion of the vehicle body lower member 17 being provided at the front portion, a rear surface portion 24b extending close to the lower portion of the vehicle body upper member 16 being provided at the rear portion. Further, a fitting portion 24c to fix and support a handle 15 is provided on the upper surface of the control lever bracket 24. In the front surface portion 24a of the control lever bracket 24, bearing holes are provided respectively at positions corresponding to the front center bearing hole of the vehicle body upper member 16 and to the center bearing hole of the vehicle body lower member 17. Further, in the rear surface portion 24b, a bearing hole is provided at a position corresponding to the rear center bearing hole of the vehicle body upper member 16.

An upper-front turning support axle 25 is fit into the upper center bearing hole of the front surface portion 24a of the control level bracket 24 in a turnable manner. Further, an upper-rear turning support axle 26 is fit into the center bearing hole of the rear surface portion 24b in a turnable manner. An axis center line of the upper-front turning support axle 25 and an axis center line of the upper-rear turning support axle 26 are set on the same axis to correspond with each other. An axle top end portion of the upper-front turning support axle 25 is fit into the hole provided in the front surface of the vehicle body upper member 16 and is fastened to be fixed with a fixing screw 27 penetrating through the front surface of the vehicle body upper member 16. Similarly, an axle top end portion of the upper-rear turning support axle 26 is fit into the hole provided in the rear surface of the vehicle body upper member 16 and is fastened to be fixed with a fixing screw 28 penetrating through the rear surface of the vehicle body upper member 16.

A lower-front turning support axle 29 is fit into the lower-center bearing hole of the front surface portion 24a of the control lever bracket 24 in a turnable manner. The control lever bracket 24 is turned in the roll direction X with the lower-front turning support axle 29 as the center of turning. In order to permit the turning of this control lever bracket 24 within a predetermined range, concave cavity portions 16d and 17d to avoid contact with the control lever bracket 24 are provided in the front surfaces of the vehicle body upper member 16 and the vehicle body lower member 17. Furthermore, an angle detection sensor 31 is attached to the upper-front turning support axle 25 to detect an operation amount (turning amount) of the handle 15 through the turning amount (turning angle) of the control lever bracket 24 in the roll direction X.

The angle detection sensor 31, as shown in FIG. 8, includes an axle portion 31a fixed to the upper-front turning support axle 25 and a detection portion 31b detecting an amount of relative rotational displacement from the axle portion 31a. The detection portion 31b is fixed to one end of a fixing plate 32, and the other end thereof is fixed to the front surface portion 24a of the control lever bracket 24 with a fixing screw 33. A potentiometer, a sensor having a variable capacitor structure and the like can be applied as the angle detection sensor 31, for example. With this angle detection sensor 31, an angle of the control lever bracket 24 inclined to the vehicle body upper member 16 can be detected by using a change in resistance value that occurs in accordance with the rotational displacement amount generated between the axle portion 31a and the detection portion 31b.

The lower end portion of the handle 15 showing a first specific example of the control lever is fixed to the fitting portion 24c of the control lever bracket 24. The handle 15 is configured to have a handle post 35 fit and fixed to the fitting portion 24c and a handle lever 36 provided at the upper end portion of the handle post 35. The handle post 35 is attached to the vehicle body 12 in a state of being slightly inclined forward, and the top end side is extended upward. The handle lever 36 is formed in U-shape, and with projection portions at both ends thereof facing upward the upper end portion of the handle lever 36 is connected to a middle portion to be integrally formed.

Further, a turning control ring 37 capable of controlling the drive of the pair of wheel drive units 14L and 14R is attached to the upper end portion of one of the projection portions of the handle lever 36. The turning control ring 37 is to control a turning motion of the vehicle by manual operation, forming an accelerator ring for the turning motion. When the turning control ring 37 is turned in a desired direction in which a rider intends to make a turn, a signal corresponding to the operation amount is output to a controller described later on. With this, the controller controls the drive of the pair of wheel drive units 14L and 14R according to the amount of the turning control ring 37 operated, generating a rotational difference between the left and right wheels 13L and 13R and so a turning travel can be performed at a desired velocity.

As shown in FIG. 8, a power source storage portion 39 accommodating a battery 38 is provided on the upper surface of the control lever bracket 24 that is a base portion of the handle 15. The battery 38 is a specific example of a power source supplying electric power to the pair of wheel drive units 14L and 14R, the controller, the other electronic devices and electric apparatus and the like. The power source storage portion 39 has a cartridge structure in this embodiment, which accommodates a large number of batteries 38. However, the power source is not limited to the battery 38 shown in this embodiment. It should be appreciated that a portable storage cell, a fuel cell, and other power sources can be used as well. The power source storage portion 39 is covered with a power source cover 41 so that rain, dust and the like are prevented from entering.

Drive circuits 44L and 44R to drive the pair of wheel drive units 14L, 14R and the like are incorporated in the chassis portion 16a of the vehicle body upper member 16. Further, in the vehicle body lower member 17 are provided a posture sensor unit 45 that is a posture detector detecting the posture of the vehicle body 12, the handle 15 and the like and outputting detection signals thereof, and a controller 46 outputting a control signal driving and controlling the pair of wheel drive units 14L, 14R and the like. The controller 46 executes predetermined arithmetic processing based on the detection signal from the posture sensor unit 45, the detection signal from the angle detection sensor 31 and the like, and a necessary control signal is output to the pair of wheel drive units 14L, 14R and the like.

As shown in FIG. 12, the controller 46 is configured to have an arithmetic circuit 47 including a microcomputer (CPU), a storage device 48 including a program memory, a data memory, other memories such as RAM and ROM, and the like, for example. The battery 38 and the pair of wheel drive circuits 44L and 44R are connected to the controller 46, and those are also connected through an emergency stop switch 49. The pair of drive circuits 44L and 44R individually control rotational velocity, rotational direction and the like of the pair of wheels 13L and 13R, and the pair of wheel drive units 14L and 14R are individually connected thereto.

To the controller 46 are supplied a detection signal from the angle detection sensor 31 to detect an inclination angle of the handle 15, a signal corresponding to a turning operation amount from the turning control ring 37 and a detection signal from the posture sensor unit 45. The posture sensor unit 45 is used to detect angular velocity and acceleration and to control the same when the coaxial two-wheel vehicle 10 is traveling, including a gyroscopic sensor and an acceleration sensor, for example.

The gyroscopic sensor detects angular velocity related to at least any one of a pitch axis 51, a roll axis 52 and a yaw axis of the vehicle body 12. The pitch axis 51 corresponds to axle of the pair of wheels 13L and 13R (see FIG. 6). The roll axis 52 is an axis passing through the center of the vehicle body 12, being parallel with a travel direction of the vehicle (see FIG. 5). The yaw axis is an axis passing through the center of the vehicle body 12, being vertical to a road surface for the vehicle to travel. Further, the acceleration sensor of the posture sensor unit 45 detects acceleration related to at least any one of three axes (X-axis, Y-axis and Z-axis) when the vehicle body 12 is explained using the three axes.

The coaxial two-wheel vehicle 10 having the above-described configuration can travel in the following manner, for example. FIGS. 4A and 4B show a state of the vehicle traveling straight on a flat road surface E, and in this state, an axis center line CL being the center of handle 15 becomes vertical to the traveling road surface E when viewed from the front. In addition, the left and right divided steps 11L and 11R are maintained horizontally at the same height.

FIG. 9 shows a state in which one wheel (left wheel 13L in this embodiment) of the vehicle that travels straight on the flat road surface E runs onto a step K. In this case, with the handle 15 being kept vertically (in the gravitational direction) by a rider, the vehicle can travel in a state in which the left and right divided steps 11L and 11R are maintained horizontally. Accordingly, even if the center of gravity of the rider driving in a standing posture is at a high position, the step K of the road surface E can be absorbed by the change in the height direction of the left and right divided steps 11L and 11R, and so the rider can drive and travel stably without the upper body being swayed left and right.

FIG. 10 shows a state of turning on the flat road surface E. In this case, the rider inclines the handle 15 and his/her upper body toward the turning center side (inside) to make the left and right divided steps 11L, 11R and the left and right wheels 13L, 13R inclined in the same direction as the handle 15, and the whole vehicle including the rider can be brought to a state of easily counteracting the centrifugal force.

Further, FIG. 11 shows a state of traveling on an inclined road surface (cant road surface M) in the direction orthogonal to the inclining direction. In this case, similarly to a change in the state of the road surface in the roll axis direction (that is the left and right direction with respect to the traveling direction) when running onto the step K, the rider keeps the handle 15 vertically (in the gravitational direction) and can travel in a state of the left and right divided steps 11L and 11R being maintained horizontally. Therefore, the cant road surface M can be absorbed by the change in the height direction of the left and right divided steps 11L and 11R. As a result, the rider can drive and travel stably without the upper body being swayed left and right even if the center of gravity of the rider driving in a standing posture is at a high position.

Next, a method of turning the coaxial two-wheel vehicle 10 is explained. FIG. 13A shows a state of the coaxial two-wheel vehicle 10 traveling straight on the flat road surface E. FIG. 13B shows a state of turning in the left direction on the flat road surface E. In addition, FIG. 13C shows a state of traveling straight on the cant road surface M (including the case of running onto the step K).

When turning the coaxial two-wheel vehicle 10, basically one of the following two methods can be used: a method of determining a turning amount (turning velocity, turning radius and the like) only by the inclination of the handle 15, and a method of determining a turning amount by the rider rotating the turning control ring 37 (accelerating turning velocity) in addition to the inclination of the handle 15.

First, an explanation is given regarding the method of determining the turning amount only by the inclination of the handle 15 to make a turn. As shown in FIG. 10, a turning operation amount in this case is determined by a handle virtually-inclined angle θh between the handle 15 and a gravity axis V. Based on the turning operation amount and vehicle velocity, a rotational difference is given to the left and right wheels 13L and 13R so that a turning radius which generates predetermined centrifugal force is obtained to make a turn. In this case, the handle virtually-inclined angle θh can be detected as follows.

The first example is that the above-described posture sensor unit 45 is attached to the handle 15 or is attached to one of the pair of divided steps 11L and 11R inclining parallel with the handle 15 so that the inclination of the handle 15 is directly detected.

The second example is that the posture sensor unit 45 is attached to the vehicle body lower member 17 as shown in FIG. 8. In this case, a position sensor is provided to detect a relative angle between the handle 15 and the vehicle body lower member 17 or between the handle 15 and the vehicle body upper member 16. In the embodiment shown in FIG. 8, the angle detection sensor 31 provided in the vehicle body upper member 16 corresponds to the position sensor, and a potentiometer and the like can be applied as the angle detection sensor 31, for example. An output of the angle detection sensor 31 and output of the posture sensor unit 45 are used to calculate the difference between a "vehicle inclination angle θg formed with the gravity axis V" that is the output of the posture sensor unit 45 inside the vehicle body 12 with the gravity axis V as reference and a "handle relatively-inclined angle θp of the handle 15 with respect to the vehicle body" that is the output of the angle detection sensor 31. Thus, the handle virtually-inclined angle θh (θp−θg=θh) of the handle 15 is detected.

For example, when the handle relatively-inclined angle θp that is the output of the angle detection sensor 31 coincides with the vehicle inclination angle θg that is the output of the posture sensor unit 45, the handle 15 is vertical and the vehicle is in the state of traveling straight regardless of the road surface status (flat road surface, cant road surface M, step K, and the like) as shown in FIGS. 11, 13A and 13C. On the other hand, when the coaxial two-wheel vehicle 10 is making a turn as shown in FIG. 10, a value obtained by subtracting the vehicle inclination angle θg that is the output of the posture sensor unit 45 from the handle relatively-inclined angle θp that is the output of the angle detection sensor 31 becomes the handle virtually-inclined angle θh formed with the gravity axis V. Thus, the turning operation amount is determined based on this handle virtually-inclined angle θh.

Next, an explanation is made regarding the method of determining the turning amount by the rider rotating the turning control ring 37 in addition to the inclination of the handle 15. This method is used in the case of almost no centrifugal force being generated (for example, the centrifugal force being 0.1 G or less) such as making a low-velocity turn, making a super-pivotal brake turn (the vehicle body makes a turn on the spot by reversely rotating the left and right wheels) and the like, for example. In such cases, operability is improved by manually rotating the turning control ring 37 provided at the top of the handle lever 36 rather than by inclining the handle, and so the rider can select an operation according to the travel velocity by using both the inclination of the handle 15 and the turning control ring. In this case, based on the turning operation of the turning control ring 37, the above-described method of determining the turning amount and making a turn only by the inclination of the handle 15 is added to the operation amount, and so the turning operation amount at the time of turning is controlled by both the methods being combined and used.

First, when the turning control ring 37 of the handle lever 36 is manually turned, the amount of the turning control ring 37 operated is detected by the position detection sensor formed of the potentiometer or the like, and a detected signal is supplied to the controller 46. Then, the controller 46 outputs a control signal to the left and right wheel drive units 14L and 14R so that a turn radius generating predetermined centrifugal force (for example, 0.2 G) according to vehicle velocity is obtained, giving a predetermined rotational difference to the left and right wheels 13L and 13R.

Here, when it is intended further to make a sharp turn, the rider inclines the handle 15 toward the center of turn. Then, the amount of the handle 15 inclined is detected by the angle detection sensor 31 as described above and a posture of the vehicle is detected by the posture sensor units 45. Thus, a wheel control amount corresponding to the amount of inclination of the handle 15 is calculated. The wheel control amount by the inclination of the handle 15 is added to the wheel control amount by the turning operation of the turning control ring 37. As a result, the controller 46 outputs a control signal to the left and right wheel drive units 14L and 14R so that the rotational difference of the left and right wheels 13L and 13R is modified to obtain a turn radius generating predetermined centrifugal force (for example, 0.4 G). Accordingly, making a turn can be performed stably without the upper body of the rider in the standing posture being swayed left and right, even if the turning velocity is fast.

In the first embodiment, the step plate is divided in two to be disposed left and right, because the following advantages are obtained when such divided two steps 11L and 11R are used. When running onto a step, for example, one of the wheels first runs onto the step K as shown in FIG. 9, but the wheel on that side can be run onto the step K with less drive power, with the rider shifting the center of gravity to the side of the lower wheel (on the side not running thereon) at this time. Subsequently, the center of gravity is shifted to the side of the wheel running thereon, then the wheel on the lower side (on the side not running thereon) runs onto the step, which makes the rider feel just like going up the step K on foot, and therefore the vehicle can run over the step K with less drive power.

FIGS. 14A, 14B and 15A, 15B are diagrams showing a coaxial two-wheel vehicle according to a second embodiment of the present invention. A coaxial two-wheel vehicle 60 shown as the second embodiment includes: a vehicle body 62 formed with one chassis, two divided steps 61L and 61R individually supported by the vehicle body 62 in a freely turnable manner, and a connecting link 68 connecting the two divided steps 61L, 61R and a control lever bracket 64 in a turnable manner. In this second embodiment, the same reference numerals are given to portions corresponding to those in the above-described first embodiment, and duplicated explanation thereof is omitted.

As shown in FIGS. 14A, 14B and 15A, 15B, the vehicle body 62 is constructed as one chassis, and left and right wheel drive units 14L and 14R are respectively attached to mounting portions 62L and 62R provided on both sides in the left and right direction that is the width direction of the vehicle body. Further, the left and right wheels 13L and 13R are respectively supported by the wheel drive units 14L and 14R in a freely rotatable manner. Further, a handle support portion 65 is provided in the center of an upper portion of the vehicle body 62, and step support portions 65L and 65R are provided on both sides of the upper portion. Bearing holes are respectively provided in the handle support portion 65 in the center and in the step support portions 65L and 65R on both sides, penetrating through the front and rear direction that is the direction for the vehicle to travel.

The three bearing holes provided in the handle support portion 65 and in the step support portions 65L and 65R of the vehicle body 62 are set at the same height, and the handle support portion 65 is supported by the control lever bracket 64 by means of a turning support axle 66 in a turnable manner. The left and right divided steps 61L and 61R are supported by the step support portions 65L and 65R in a turnable manner by means of upper turning support pins 67L and 67R. Each of the divided steps 61L and 61R is provided with an arm portion 61a projecting in the direction vertical to the step surface on which a foot is put. In each arm portion 61a, bearing holes are provided in a base portion and top end portion thereof respectively, and the above-described upper turning support pins 67L and 67R are fit into the bearing holes of the base portions in a freely turnable manner.

In addition, both end portions of the connecting link 68 connecting the arm portions 61a of the divided steps 61L and 61R on the left and right are connected to the bearing holes at the top end portions of the respective arm portions 61a in a freely turnable manner by means of lower turning support pins 69L and 69R. Further, the control lever bracket 64 is connected to a middle portion in the axis direction of the connecting link 68 in a freely turnable manner by means of a turning connection pin 71. Therefore, two bearing holes having the same interval as between the two bearing holes provided in each of the arm portions 61a are provided in the control lever bracket 64. Hence, the control lever bracket 64, the left and right divided steps 61L, 61R and the connecting link 68 constitute a parallel link mechanism. The other configuration than the above is similar to the above-described first embodiment.

Thus, when the rider inclines the handle 15 or the divided steps 61L and 61R, the left and right divided steps 61L and 61R or the handle 15 synchronously tilts in the same direction. FIG. 15A is a diagram showing an initial state in which the handle 15 is in an upright position. FIG. 15B is a diagram showing a state in which the handle 15 and the left and right divided steps 61L and 61R are inclined. At this time, the upper surface of the left and right divided steps 61L and 61R is in a state of being inclined toward the road surface E by the amount of inclination of the handle 15. Effectiveness similar to that of the above-described first embodiment can also be obtained with the configuration of the coaxial two-wheel vehicle 60 as described above.

FIGS. 16A, 16B and 17A, 17B are diagrams showing a coaxial two-wheel vehicle according to a third embodiment of the present invention. A coaxial two-wheel vehicle 80 shown as the third embodiment includes: a vehicle body 82 formed with one chassis, one step plate 81 supported by the vehicle body 82 in a manner of making a posture freely changeable, and the handle 15 being the control lever integrally fixed to the step plate 81. In this third embodiment, the same reference numerals are given to portions corresponding to those in the above-described first embodiment, and a duplicated explanation thereof is omitted.

As shown in FIGS. 16A, 16B and 17A, 17B, the vehicle body 82 is constructed as one chassis, and left and right vehicle drive units 14L and 14R are respectively attached to mounting portions 82L and 82R provided on both sides in the left and right direction that is a width direction of the vehicle body. Further, the left and right wheels 13L and 13R are respectively supported by the wheel drive units 14L and 14R in a freely rotatable manner. A step support portion 85 is provided in the center of an upper portion of the vehicle body 82. In this step support portion 85, a bearing hole is provided to penetrate in the front and rear direction that is the direction for the vehicle to travel.

The step plate 81 is constructed as one plate having the size to cover approximately the whole range from the vehicle body 82 to the left and right wheels 13L and 13R. A bracket portion 84 is integrally provided approximately in the center portion in the left and right direction on the lower surface of the step plate 81. The bracket portion 84 is made of two convex portions at a predetermined interval in the front and rear direction, and the step support portion 85 of the vehicle body 82 is fit between those convex portions. The bracket portion 84 and step support portion 85 are supported from the front and rear in a freely turnable manner by means of two turning support axles 86 disposed on the same axis center line.

Furthermore, four coil springs 87 showing a specific example of an elastic member to maintain the step plate 81 horizontally with respect to the vehicle body 82 are interposed between the step plate 81 and the vehicle body 82. The four coil springs 87 are disposed at predetermined intervals to be symmetrical in the front and rear direction and in the left and right direction, respectively. For this purpose, four spring support portions 88 to support the upper end of the coil springs 87 are provided at four positions on the lower surface of the step plate 81, and correspondingly thereto, four spring support portions 89 to support the lower end of the coil springs 87 are provided at four positions on the upper surface of the vehicle body 82.

Thus, when the rider inclines one of the handle 15 and step plate 81, the other integrally formed is inclined integrally in the same direction. FIG. 17A is a diagram showing an initial state in which the handle 15 is in an upright position. FIG. 17B is a diagram showing a state in which the handle 15 and the step plate 81 are inclined. At this time, the upper surface of the step plate 81 is in a state being inclined toward the road surface E by the amount of inclination of the handle 15. Effectiveness similar to the above-described first and second embodiments can also be obtained with the configuration of the coaxial two-wheel vehicle 80 as described above. Here, it should be appreciated that the elastic member is not limited to the coil spring 87 shown in this embodiment, and a board spring, a rubber-like elastic body or the like, for example, can be used as well.

FIGS. 18 through 20 are diagrams showing a coaxial two-wheel vehicle according to a fourth embodiment of the present invention. A coaxial two-wheel vehicle 100 shown as the fourth embodiment includes: a vehicle body 102 formed with one chassis and a step plate 101 integrally formed on an upper portion of the vehicle body 102. Further, the handle 15 being the control lever is attached to the vehicle body 102 in a turnable manner with a certain roll axis being set as the center of turning movement. The vehicle body 102 includes a return biasing mechanism biasing the handle 15 to be always returned to a neutral position that is an initial position. In this fourth embodiment, the same reference numerals are given to portions corresponding to those in the above-described first and other embodiments, and a duplicated explanation thereof is omitted.

As shown in FIGS. 18A, 18B and 19A, 19B, the vehicle body 102 is constructed as one chassis having an appropriate thickness. A front concave portion 103F and a rear concave portion 103B permitting a turning operation of the handle 15 in the roll direction are provided at the front and rear of a center portion of the vehicle in the left and right direction, that is, a width direction. Further, mounting portions 102L and 102R are provided on both sides in the width direction of the vehicle body 102, and the left and right wheel drive units 14L and 14R are respectively fixed to the mounting portions 102L and 102R. Further, the left and right wheels 13L and 13R are supported by the left and right wheel drive units 14L and 14R in a freely rotatable manner on the same axis center line such that the axis center lines being the rotational center correspond with each other.

In addition, the flat board-shaped step plate 101 larger than the upper part of the vehicle body 102, extending in four directions is integrally provided on the upper part of the vehicle body 102. As shown in FIG. 20, the above-described front concave portion 103F and rear concave portion 103B are provided in the step plate 101 and vehicle body 102 by forming a recess on the front and rear sides at the center portion in the left and right direction, preparing left and right riding portions 101L and 101R. A front turning support pin 105F and a rear turning support pin 105B are respectively attached to the front surface of the front concave portion 103F and to the rear surface of the rear concave portion 103B in a state of the axis center lines corresponding with each other in the front and rear direction. A control lever bracket 104 is supported by those front and rear turning support pins 105F and 105B in a freely turnable manner in the roll direction with respect to the vehicle body 102.

The control lever bracket 104 includes a front arm portion 104a facing the front surface of the vehicle body 102, a rear arm portion 104b facing the rear surface of the vehicle body 102, a bridge portion 104c extending between the front arm portion 104a and rear arm portion 104b and facing the upper surface of the vehicle body 102, and a cylindrical shaft portion 104d formed on the upper surface of the front side of the bridge portion 104c. A lower end portion of the handle post 35 of the handle 15 is fit into the cylindrical shaft portion 104d and is fixed thereto by press fitting using a fastening mechanism, for example, and so the handle 15 is fixed to the control lever bracket 104 to be integrally provided.

A through hole is provided in a portion close to the bridge portion 104c of the front arm portion 104a of the control lever bracket 104, and a screw shaft portion of the front turning support pin 105F that penetrates the through hole is screwed into a screw hole provided in the front surface of the vehicle body 102. A tip portion of the front arm portion 104a is extended in the vicinity of the lower surface of the vehicle body 102, on the top end of which is provided a control portion 106 to which return bias force caused by a return biasing mechanism 107 acts from both the left and right sides. In addition, a through hole is provided in a tip portion of the rear arm portion 104b, and a screw shaft portion of the rear turning support pin 105B that penetrates the through hole is screwed into a screw hole provided in the rear surface of the vehicle body 102. Accordingly, the handle 15 is supported by the vehicle body 102 in a manner capable of being freely turnable in the roll direction around the roll axis connecting the axis center lines of the front and rear turning support pins 105F and 105B as the center.

As shown in FIGS. 19A and 19B, the return biasing mechanism 107 is configured to have a pair of pressing rods 108L and 108R, a pair of sleeves 109L and 109R, coil springs 110L and 110R and the like. The pair of pressing rods 108L and 108R are disposed on both the left and right sides of the control portion 106 of the control lever bracket 104. The pair of sleeves 109L and 109R support each of the pressing rods 108L and 108R in a manner capable of being freely slidable in the axis direction. The coil springs 110L and 110R show a specific example of an elastic member biasing each of the pressing rods 108L and 108R to the side of the control portion 106. The sleeves 109L and 109R are provided to reduce sliding frictional force of the pressing rods 108L and 108R respectively, being fixed to the vehicle body 102 by press fitting using a fastening mechanism, for example. It should be appreciated that the elastic member is not limited to the coil spring, and not only a board spring and a torsion spring but also a rubber-like elastic body and the like can be used.

The return biasing mechanism 107 is arranged in the front concave portion 103F of the vehicle body 102. In order to accommodate the pair of coil springs 110L and 110R of the return biasing mechanism 107, the front concave portion 103F is formed as a concave portion extending toward the bottom with a lower portion thereof being wide. Accordingly, thick inclined surface portions 111L and 111R symmetrically disposed on the left and right are formed in the front portion of the vehicle body 102, and the sleeves 109L and 109R are each pressed and fixed to a hole provided in each of the inclined surface portions 111L and 111R.

The pair of sleeves 109L and 109R are disposed symmetrically on the left and right in a state of one end being slightly inclined toward the front arm portion 104a. The pressing rods 108L and 108R are inserted into the holes of those sleeves 109L and 109R respectively in a manner capable of being freely slidable in the axis direction. Accordingly, axis center lines of the pair of pressing rods 108L and 108R intersect with each other in the state of being somewhat inclined from a horizontal state. The pair of pressing rods 108L and 108R are inclined so as to correspond with the turning movement of the control portion 106 being provided at the top end of the front arm portion 104a and turning with the front turning support pin 105F being the center. Thus, the direction of inputting control force generated by the turning movement of the control portion 106 is set to correspond approximately with the axis center lines of the pressing rods 108L and 108R, enabling the pressing rods 108L and 108R to smoothly slide with comparatively small force.

With respect to the pressing rods 108L and 108R, at the end close to the front arm portion 104a is integrally provided a flange-shaped contact portion 114 and at the other end on the opposite side is fastened and integrally provided a retaining ring 115 using a fixing screw 116. The coil springs 110L and 110R are mounted on the pressing rods 108L and 108R respectively such that one end of each coil spring of 110L and 110R is respectively seated on the contact portion 114 and the other end thereof is respectively seated on external surfaces of the inclined surface portions 111L and 111R. The retaining ring 115 having an outside diameter larger than the sleeves 109L and 109R is tightened and fixed to the other end of each of pressing rods 108L and 108R using the fixing screw 116. The retaining ring 115 is provided to prevent the pressing rods 108L and 108R from slipping off the sleeves 109L and 109R respectively and to make the contact portion 114 project into a predetermined position.

Thus, the pair of pressing rods 108L and 108R are biased constantly to the inside of the vehicle body 102 by the spring force of the coil springs 110L and 110R, and a movement to the inside thereof is restricted by the retaining ring 115. Inclined surfaces 106L and 106R having inclinations corresponding to the tilt angles of the pressing rods 108L and 108R are provided on both left and right sides of the control portion 106 so that the force is conveyed surely between the contact portions 114 of those pressing rods 108L, 108R and the control portion 106 of the control lever bracket 104. In an initial state shown in FIG. 19A, the axis center lines of the pressing rods 108L and 108R are set such that those lines intersect approximately vertically the inclined surfaces 106L and 106R, respectively.

Further, the angle detection sensor 31 detecting a tilt angle of the handle 15 with respect to the vehicle body 102 is provided for the control lever bracket 104 in relation to the front turning support pin 105F. This angle diction sensor 31 can detect the tilt angle of the handle 15 with respect to the vehicle body 102 by obtaining a relative angle between the handle post 35 and the front turning support pin 105F fixed to the vehicle body 102, and so a detection signal corresponding to the tilt angle can be output. The controller outputs a predetermined control signal to the left and right wheel drive units 14L and 14R based on the detection signal and controls rotational velocity of the left and right wheels 13L and 13R, performing a predetermined turning according to the tilt angle.

With respect to controlling the traveling of the coaxial two-wheel vehicle 100, the tilt angle of the handle 15 with respect to the gravity axis can also be detected as a gravity axis reference. Reference numeral 118 shown in FIG. 18B denotes a posture sensor unit to detect the tilt angle of the handle 15 with respect to the gravity axis. The posture sensor unit 118 is mounted on the bridge portion 104c of the control lever bracket 104, being disposed in approximately the center portion (approximately center-of-gravity position) of the coaxial two-wheel vehicle 100.

FIGS. 18A, 18B, 19A and 20 are diagrams showing an initial state in which the handle 15 is held in an upright position on a flat road. In this case, the upper surface of the step plate 101 is in a state of being parallel with the road surface E, and the axis center line CL of the handle 15 is directed in the gravitational direction and is in a state being vertical to the road surface E. At that time, the pair of pressing rods 108L and 108R of the return biasing mechanism 107 are pressed from both the left and right sides with equal force to the inclined surfaces 106L and 106R on both the sides of the control portion 106 provided at the lower end of the control lever bracket 104 integrally formed with the handle 15. Consequently, the handle 15 is maintained in a neutral position in which the axis center line CL thereof is directed in the gravitational direction. In this state, the rider stands on the step plate 101 in a posture being parallel with the gravity and maintains the state in which the axis center line CL of the handle 15 is directed in the gravitational direction, and so the coaxial two-wheel vehicle 100 can travel straight with stability.

Further, when the road surface is a cant road surface or a stepped road surface having a step on one side, the upper surface of the step plate 101 becomes a state being inclined in the roll direction around the roll axis as the center according to a tilt angle of the cant road surface and a height of the step. In this case, the rider stands in parallel with respect to the gravity while maintaining a state in which the handle 15 orthogonally intersects the vehicle body 102 (making the axis center line CL of the handle 15 orthogonal to the tilt angle), and so the coaxial two-wheel vehicle 100 can travel straight with stability.

FIG. 19B is a diagram showing a state in which the handle 15 is inclined to the side of the left wheel 13L on the flat road. The handle 15 is inclined by moving backward the pressing rod 108R against the spring force of the coil spring 110R positioned outside the turning direction, and so the state shown in FIG. 19A is changed to the state shown in FIG. 19B. Then, the rider inclines the center-of-gravity position together with the handle 15 to the inside of the turning direction, and so the coaxial two-wheel vehicle 100 can make a turn with stability. At this time, the turning control ring 37 of the handle 15 is simultaneously turned, and so the turn velocity can further be adjusted.

When the force inclining the handle 15 is reduced in the above state of turning (for example, the hand of the rider is released from the handle 15), only the pressing rod 108R on one side is brought into contact with the inclined surface 106R on one side of the control portion 106. Therefore, the force generated by biasing the coil spring 110R mounted on the pressing rod 108R acts on the inclined surface 106R on one side. On the other hand, a gap is provided between the inclined surface 106L on the other side and the pressing rod 108L on the other side. Accordingly, the pressing rod 108R on one side presses the inclined surface 106R on one side of the control portion 106 by the biasing force of the coil spring 110R on one side, and so the control lever bracket 104 is turned in the counterclockwise direction in FIG. 19B.

Further, when the handle 15 returns to the state shown in FIG. 19A where the axis center line CL of the handle 15 becomes vertical to the road surface E, the pressing rod 108L on the other side is brought into contact with the inclined surface 106L on the other side of the control portion 106. Accordingly, further turning movement of the control lever bracket 104 is restricted by the spring force of the coil spring 110L on the other side mounted on the pressing rod 108L on the other side. Thus, the force for returning to the neutral position that is the initial position constantly acts on the handle 15, and so the handle 15 is maintained at the neutral position in a state of no operation force being applied.

FIGS. 21 through 23 are diagrams showing a coaxial two-wheel vehicle according to a fifth embodiment of the present invention. A coaxial two-wheel vehicle 120 shown as the fifth embodiment includes a saddle unit 121 for a rider to sit on, based on the coaxial two-wheel vehicle 10 according to the first embodiment shown in FIG. 4 and other figures. The saddle unit 121 is configured to have a saddle 122 on which the rider can sit, a support rod 123 that supports the saddle 122, a buffer rod 124 that supports the support rod 123 in a manner capable of making advance and retreat movement, and the like. Since the other configuration than that is similar to the coaxial two-wheel vehicle 10, the same reference numerals are given to the same portions and a duplicated explanation thereof is omitted.

The saddle 122 is a saddle similar to ones generally used for a bicycle, including a seat portion 122a for a person to sit on, a frame portion 122b to support the seat portion 122a and the like. The frame portion 122b is fixed to the upper end of the support rod 123 in a detachable manner. A plurality of coil springs are attached to the frame portion 122b, and the seat portion 122a is supported with elasticity through the coil springs.

The support rod 123 includes an inner rod 123a and an outer rod 123b constituting a bushing structure, in which the frame portion 122b of the saddle 122 is attached to the upper end of the inner rod 123a. A clamp 125 to tightly fix the inner rod 123a is attached to the upper end of the outer rod 123b, and the inner rod 123a can be fixed at an arbitrary height by tightening the clamp 125. Further, a fixing member 126 to fix the support rod 123 to the handle 15 is provided at the lower end of the outer rod 123b.

The fixing member 126 includes a joint portion 126a to hold the lower end of the outer rod 123b, a band portion 126b to tighten the handle post 35, a connecting shaft 126c to connect those band portion 126b and joint portion 126a in a turnable manner, and the like. The band portion 126b can be tightly fixed to the handle post 35 by using a fixing screw 127. Accordingly, the support rod 123 is formed in a manner of being turnable in the front and rear direction around the connecting shaft 126c as the center of the turning movement. The buffer rod 124 is provided in order that the support rod 123 can make the advance and retreat movement within a predetermined range by restricting a turning amount in the front and rear direction.

As shown in FIGS. 22A and 22B, the buffer rod 124 includes a first cylindrical body 131 and a second cylindrical body 132, which are capable of mutually making the advance and retreat movement, and a coil spring 133 to pull the first cylindrical body 131 and the second cylindrical body 132. The second cylindrical body 132 has a small diameter portion 132a fit into a hole of the first cylindrical body 131 in a detachable manner. Both the cylindrical bodies 131 and 132 are capable of relatively moving in the axis direction within a range of the length of the small diameter portion 132a without being detached from each other. Further, stopper pins 134 and 135 penetrating each cylindrical body in the diameter direction are provided in the first cylindrical body 131 and the second cylindrical body 132, respectively.

One end of the coil spring 133 is latched to the stopper pin 134 on one side, and the other end of the coil spring 133 is latched to the stopper pin 135 on the other side. The coil spring 133 is arranged in a compressed state as a bridge between the two stopper pins 134 and 135. The two cylindrical bodies 131 and 132 are constantly biased in a direction pulling each other by spring force of the coil spring 133. A first mounting bracket 136 is fixed to one end of the buffer rod 124, and a second mounting bracket 137 is fixed to the other end thereof.

The first mounting bracket 136 is made of a band-shaped member capable of tightening the handle post 35, being connected to the first cylindrical body 131 in a turnable manner by a first pivot 138. Similarly, the second mounting bracket 137 is made of a band-shaped member capable of tightening the outer rod 123b, being connected to the second cylindrical body 132 in a turnable manner by a second pivot 139. Further, the first mounting bracket 136 and the second mounting bracket 137 can be tightly fixed to the handle post 35 or to the outer rod 123b by respectively using the fixing screws 127.

According to the coaxial two-wheel vehicle 120 including the saddle unit 121, the coaxial two-wheel vehicle 120 can be driven and operated in the state of the rider sitting on the saddle 122 as shown in FIG. 23. In such case also, the coaxial two-wheel vehicle 120 can travel straight and make a turn with stability similarly to the above-described first embodiment. In this case, the movement and operation for the driving of the coaxial two-wheel vehicle 120 are similar to those described in the first embodiment.

In this embodiment, when a person rides on the vehicle with the whole weight being put on the saddle 122, the driving operation is performed based on the shift of the center of gravity caused by the movement of his/her upper body. For this reason, there is a possibility of an agile driving operation being difficult. Therefore, desirably the person rides on the vehicle such that his/her weight is distributed to both the saddle 122 and the divided steps 11L, 11R (in the case of one step being provided as well). According to the riding in such manner, an agile forward and backward traveling based on the shift of the center of gravity of the rider's whole body including leg portions can be obtained. Furthermore, agile operation of the handle 15 in the roll direction becomes also possible using a change in weight distributed to the left and right divided steps 11L and 11R. Particularly, since a part of the rider's weight is supported by the saddle 122 according to this embodiment, loads imposed on the leg portions can be reduced to cause less fatigue.

Further, the saddle 122 is provided to be capable of making the advance and retreat move in the forward and backward direction with respect to the handle 15 in this embodiment, and therefore a possibility of restricting the movement of the leg portions due to sitting on the saddle 122 can be reduced. For example, when it is assumed that the saddle 122 is fixed and may not move at the time of traveling in the state of sitting on the saddle 122, it is difficult for the rider to shift the center of gravity backward, and therefore it is difficult to make quick acceleration and quick stop based on the weight shift. However, the saddle 122 in this embodiment is provided as described above, that is, capable of making the advance and retreat move in the forward and backward direction without preventing the rider's backward movement, and so the quick acceleration and quick stop can be made safely and easily. Moreover, when the force moving the saddle 122 is released after the saddle 122 being backward, the saddle 122 is returned automatically to a predetermined position on the front side by the spring force of the coil spring 133, and so an interval between the handle 15 and the saddle 122 can be returned to an original state with stability.

FIG. 24 is a diagram showing a coaxial two-wheel vehicle according to a sixth embodiment of the present invention. A coaxial two-wheel vehicle 140 shown as the sixth embodiment includes an auxiliary wheel 141 projecting to the front side of the vehicle, based on the coaxial two-wheel vehicle 120 according to the fifth embodiment shown in FIG. 21 and other figures. In this sixth embodiment, a difference from the coaxial two-wheel vehicle 120 according to the fifth embodiment is only the structure of the auxiliary wheel 141, and therefore the auxiliary wheel 141 is explained herein. With respect to the other portions, the same reference numerals are given and a duplicated explanation thereof is omitted. Although an example of the auxiliary wheel projecting to the front side of the vehicle is explained in this embodiment, it should be appreciated that the auxiliary wheel may be provided to project to the rear side of the vehicle.

The auxiliary wheel 141 is attached to the lower end of a stick 142 in a freely rotatable manner. The stick 142 includes a rod 143 formed of a pipe-shaped member, a fixing member 144 fixed to the upper end of the rod 143, and a bearing bracket 145 fixed to the lower end of the rod 143. The fixing member 144 is configured to have a joint portion 144a to hold the upper end of the rod 143, a band portion 144b to tighten the handle post 35, a connecting screw 144c to connect those band portion 144b and joint portion 144a in a turnable manner, and the like. The band portion 144b can be fixed tightly to the handle post 35 with the fixing screw 127.

The bearing bracket 145 has a holding portion 145a to hold the lower end of the rod 143 and a bearing portion 145b supported by the holding portion 145a in a freely turnable manner. The bearing portion 145b is freely turnable around an axis center line of the rod 143 as the center of turning movement using the hold portion 145a. The bearing portion 145b includes a pair of bearing strips projecting downward in parallel, and a support shaft 146 extending in the horizontal direction is supported at both ends by the pair of bearing strips. The auxiliary wheel 141 is supported by the support shaft 146 in a freely rotatable manner.

A typical wheel that is freely rotatable in the forward and backward direction can be used as the auxiliary wheel 141, however, desirably, a wheel freely rotatable in the horizontal direction as well as in the forward and backward direction is used. Wheels such as an omni-wheel and a caster wheel, for example, can be listed as the wheel of such kind. A turn buckle 147 is provided so that the stick 142 to which the auxiliary wheel 141 is attached is supported in a manner capable of adjusting an angle thereof.

The turn buckle 147 includes a retractable shaft portion 148 whose length in the axis direction is adjustable, a handle-side band portion 150 provided at one end of the retractable shaft portion 148 and a stick-side band portion 151 provided at the other end of the retractable shaft portion 148. The retractable shaft portion 148 includes a turnable shaft 148a, a first cylindrical body 148b and a second cylindrical body 148c. The turnable shaft 148a includes a right-handed male screw provided on one side thereof and a left-handed male screw provided on the other side thereof in the axis direction. The first cylindrical body 148b includes a right-handed female screw provided on the inner surface of the cylindrical body. The second cylindrical body 148c includes a left-handed female screw provided on the inner surface of the cylindrical body. Those are screwed together in a retractable manner. Further, connecting strips are provided at one end of the first cylindrical body 148b and at one end of the second cylindrical body 148c, respectively. Those connecting strips are each connected to connecting strips of the band portions 150 and 151 in a turnable manner with a connection screw 150, respectively.

The band portion 150 on the handle side is tightly fixed to the handle post 35 using the fixing screw 127. Further, the band portion 151 on the stick side is tightly fixed to the rod 143 using the fixing screw 127. When the turnable shaft 148a of the retractable shaft portion 148 being a bridge between those band portions 150 and 151 is rotated in one direction to increase (extend) an interval between the first cylindrical body 148b and the second cylindrical body 148c, the stick 142 is pushed forward to make an interval between the auxiliary wheel 141 and the wheels 13L, 13R increase. On the contrary, when the turnable shaft 148a is rotated in the other direction to reduce (shorten) the interval between the first cylindrical body 148b and the second cylindrical body 148c, the stick 142 is pulled backward to make the interval between the auxiliary wheel 141 and the wheels 13L, 13R reduce. Similarly to the coaxial two-wheel vehicle 10 according to the first embodiment, the coaxial two-wheel vehicle 140 including the auxiliary wheel 141 can travel straight and make a turn with stability by carrying out the control of the traveling as described above.

FIGS. 25 through 27 are diagrams showing a coaxial two-wheel vehicle according to a seventh embodiment of the present invention. A coaxial two-wheel vehicle 160 shown as the seventh embodiment is configured such that the turning can be performed by an operation using feet of a rider. This coaxial two-wheel vehicle 160 includes a handle post 162 which is obtained by shortening the handle post 35 of the coaxial two-wheel vehicle 10 shown in FIG. 4 and other figures and at the top end of which is provided a foot control portion 163. In this seventh embodiment, a difference from the coaxial two-wheel vehicle 10 according to the first embodiment is only the structure of the handle post 162 and foot control portion 163, and therefore those are explained herein. With respect to the other portions, the same reference numerals are given and a duplicated explanation thereof is omitted.

As shown in FIGS. 25 and 26, a handle 161 includes the handle post 162 formed by cutting the handle post 35 of the handle 15 of the coaxial two-wheel vehicle 10 at an appropriate low position in the height direction and the foot control portion 163 provided at the top end of the handle post 162. The foot control portion 163 includes a pair of knee holding members 164L and 164R receiving and holding knee portions of a rider, a lever member 165 to which the pair of knee holding members 164L and 164R are fixed and which has a grip portion 165a, for example, to be carried, a lever fixing member 166 to fix the lever member 165 to the handle post 162, and the like.

The pair of knee holding members 164L and 164R receive and hold the knee portions of the rider, conveying a movement in the roll direction of the knee portions to the handle post 162. The knee holding members 164L and 164R are formed as a gutter-shaped semi-cylindrical body such that a cylinder of an appropriate length is cut into a half. Knee pads 167 softening contacts with knee portions and absorbing shocks are respectively attached to inner surfaces of the pair of knee holding members 164L and 164R by a fastening mechanism using adhesive or the like. Such pair of knee holding members 164L and 164R are integrally fixed to both the ends of the lever member 165 extending in the horizontal direction.

The lever member 165 is made of a rod-shaped member extending straight and the grip portion 165a is integrally provided in a middle portion in the lengthwise direction thereof. The grip portion 165a is made of a handle formed into U-shape, and the lever member 165 is fixed to the lever fixing member 166 in a state of this grip portion 165a being projected upward. The lever fixing member 166 includes a fixing plate 166a to which the lever member 165 is fixed and a retainer plate 166b to sandwich and hold the handle post 162 with the fixing plate 166a. The fixing plate 166a includes a fixing portion extending in the horizontal direction to contact with the lever member 165, at the both ends of which are provided flange portions having through holes. A screw shaft portion of a fixing screw is inserted into the through hole of each flange portion, and the lever member 165 is tightly fixed to the fixing plate 166a using two fixing screws 168.

Semi-circular cutouts each having a curvature radius fit for the diameter of the handle post 162 are provided in the bonded planes of the fixing plate 166a and retainer plate 166b. Further, a through hole to insert a screw shaft portion of a fixing screw 169 is provided on both sides of the cutout of the retainer plate 166b. An outer circumferential surface of the handle post 162 is held by the cutouts of the retainer plate 166b and of the fixing plate 166a, and the retainer plate 166b is tightened with the fixing plate 166a in this state using two fixing screws 169. Accordingly, the foot control portion 163 is tightly fixed to the handle post 162 through the lever fixing member 166, constituting the handle 161.

FIG. 27 is an explanatory diagram showing a state of use regarding the coaxial two-wheel vehicle 160. The rider places a left foot on the left divided step 11L and places a right foot on the right divided step 11R by straddling the handle 161, and brings a knee of a left leg into contact with the inside of the left knee holding member 164L and brings a knee of a right leg into contact with the inside of the right knee holding member 164R. In this state, the rider makes the handle 161 inclined to the left side or to the right side by shifting knee positions in the left and right direction, and so the turn of the coaxial two-wheel vehicle 160 can be made similarly to the above-described coaxial two-wheel vehicle 10.

Particularly, since the coaxial two-wheel vehicle 160 according to the seventh embodiment can be controlled to travel by the operation only using feet without using hands and arms during the travel, the arms and hands can be used freely to hold a package and handle an object, for example. In addition, since the grip portion 165a is provided with the lever member 165 of the handle 161, a movement of the rider getting on and of f can be made safely by holding the grip portion 165a, for example, and hands can be used to assist the turning. Further, the coaxial two-wheel vehicle 160 can be carried easily by holding the grip portion 165a.

FIGS. 28 and 29 are diagrams showing a coaxial two-wheel vehicle according to an eighth embodiment of the present invention. A coaxial two-wheel vehicle 180 shown as the eighth embodiment includes two handles 181L and 181R used to make a turn. The handle 15 of the coaxial two-wheel vehicle 60 shown in FIG. 14 and other figures is not provided in this coaxial two-wheel vehicle 180 while the two handles 181L and 181R are provided for left and right divided steps 182L and 182R. In this eight embodiment, a difference from the coaxial two-wheel vehicle 60 according to the second embodiment is only the structure relating to the two handles 181L and 181R, and therefore that different portion is explained herein. With respect to the other portions, the same reference numerals are given and a duplicated explanation thereof is omitted.

As shown in FIGS. 28A, 28B and 29A, 29B, the handles 181L and 181R are integrally provided on upper surfaces of the left and right divided steps 182L and 182R, respectively. The left and right handles 181L and 181R have pipe-shaped handle posts 183 extending straight and grips 184 provided at the upper ends thereof. The turning control ring 37 is provided at the upper end of the left handle 181L on one side. The lower ends of the handle posts 183 are fit into boss portions 185L and 185R provided on the upper surfaces of the left and right divided steps 182L and 182R, respectively, being integrally fixed by press fitting using a fastening mechanism. It should be appreciated that the handle post 183 may be fixed to each of the boss portions 185L and 185R by other fastening mechanism such as using a fixing screw.

The left and right boss portions 185L and 185R are disposed at front end and on the outer side of the upper surfaces of the left and right divided steps 182L and 182R with a certain distance from each other. Therefore, a gap allowing the rider to easily pass through is provided between the left and right handles 181L and 181R. Accordingly, the rider riding on the steps can get off the vehicle through the gap between the two handles 181L and 181R toward the center position on the front side.

The posture sensor unit 45 being the posture detector detecting the posture of the vehicle body 62 to output the detection signal is incorporated in the vehicle body 62 that supports the left and right divided steps 182L and 182R in a turnable manner. The step support portions 65L and 65R are provided on both sides of the upper portion of the vehicle body 62. A bearing hole is provided in each of the step support portions 65L and 65R respectively in a manner penetrating through the front and rear direction that is the traveling direction of the vehicle. The bearing holes provided in the left and right step support portions 65L and 65R are set at the same height, and the left and right divided steps 182L and 182R are supported in a turnable manner by the upper turning support pins 67L and 67R that penetrate through those bearing holes.

Each of the divided steps 182L and 182R includes the arm portion 61a projecting in the downward direction that is vertical to the step surface where feet are respectively placed. Bearing holes are provided at the top end portion and base portion of each arm portion 61a, and the above-described upper turning support pins 67L and 67R are fit into the bearing holes at the base portion in a freely turnable manner. Further, the angle detection sensor 31 detecting a tilt angle of the handle 181L is provided with the upper turning support pin 67L that is the center of turning movement of the handle 181L on one side.

Further, both the end portions of the connecting link 68 connecting the arm portions 61a of the left and right divided steps 182L and 182R are connected to each bearing hole at the top end portion of the arm portions 61*a* in a freely turnable manner by the lower turning support pins 69L and 69R, respectively. Accordingly, a parallel link structure is constructed with the left and right divided steps 182L, 182R and the connecting link 68 to be synchronous with the inclination of the two handles 181L and 181R. The other configuration is similar to the above-described second embodiment. With the coaxial two-wheel vehicle 180 of such structure, the similar effectiveness to the above-described first through seventh embodiments can be obtained.

Specifically, when the rider inclines at least one of the left and right handles 181L and 181R (or both the handles 181L and 181R) in an arbitrary direction regarding the left and right direction, a tilt angle thereof is detected by the angle detection sensor 31 based on an inclination of the left divided steps 182L, and a detection signal thereof is output to the controller. As a result, the controller 46 outputs control signals to the left and right wheel drive units 14L and 14R, controlling a rotational difference of the left and right wheels 13L and 13R. Accordingly, the coaxial two-wheel vehicle 180 can make the turn stably without causing the upper body of the standing rider to be swayed left and right. At this time, with a turning command given to generate predetermined centrifugal force considering vehicle velocity, further a smooth turn can be made.

Further, the above-described turning command for controlling the rotational difference can be given based on not only the result detected by the angle detection sensor detecting the tilt angle of the divided steps 182L and 182R but also the result detected by the posture sensor unit 45 that is formed of the acceleration sensor or the like provided in the vehicle body 62 and that can detects the gravity axis. In this regard, since the tilt angle of the divided steps 182L and 182R is obtained from the posture sensor unit 45, an influence caused by an inclined road surface in the left and right direction to the vehicle body 62 can be eliminated when traveling on the inclined road surface such as a cant road surface. Therefore, the vehicle can travel in a posture parallel with the direction of gravity axis.

Further, since the two handles 181L and 181R are disposed left and right at a predetermined interval in this embodiment, there is no obstacle with respect to the rider in the front and rear direction and the rider can get on and off the vehicle from either the front side or the rear side of the vehicle. Accordingly, it becomes easy to avoid an overturn in the front and rear direction of the coaxial two-wheel vehicle 180.

According to the above-described embodiments of the present invention, since the turn is made by inclining the step plates or the handle in the roll axis direction to the inside of the turn as explained above, a rider can stably drive and travel the vehicle against the centrifugal force even in a state of the rider standing with the center of gravity at a high position. In this regard, by attaching the axle and the wheel to the step plate portion, a camber angle is generated inside the turn regarding the wheel, and so lateral force applied to a tire can be reduced and a stable tire grip can be obtained.

Further, the pair of divided steps remain horizontal without inclining left and right when the road surface changes in the roll axis direction (the left and right direction orthogonal to the traveling direction of the vehicle) such as when traveling on a cant road surface and running onto the step by one wheel. Therefore, such road surface change can be absorbed by the change in the height direction based on the upward and downward modification of the pair of divided steps. Accordingly, a rider can stably drive the vehicle and travel without causing the upper body to be swayed left and right even when the rider is in a standing posture with the center of gravity at a high position. Moreover, when running onto a step in the oblique direction, similarly to ascending stairs on foot, the rider can climb up the step with less drive power by shifting the center of gravity put over left and right feet.

Furthermore, according to the embodiments of the present invention, the coaxial two-wheel vehicle can be made having the size of a projected floor area of an average person (about 400 mm or less in width and about 250 mm or less in length). In this regard, since the vehicle has the width equivalent to a space for a person walking, traveling can be performed smoothly without being an obstacle to other people walking even in a crowded area such as on a sidewalk.

The present invention is not limited to the above-described embodiments in which a grip portion of the handle is formed into a U-shape, for example, but the grip portion may also be a straight line shape, an oval shape or a circular shape, and it should be appreciated that other handle shapes can also be applied as well. Thus, various modifications can be implemented without deviating from the scope and spirit of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A coaxial two-wheel vehicle comprising:
    a step plate for a rider to ride on;
    a vehicle body supporting said step plate to be capable of changing a posture of the step plate in a roll direction around a roll axis, and wherein a traveling direction has a component extending in a direction of the roll axis;
    a pair of wheels disposed at both sides of said vehicle body, and wherein an axis extending through said pair of wheels is orthogonal to said roll axis, and wherein the pair of wheels are rotatably supported by the vehicle body;
    a pair of wheel drivers driving and rotating said pair of wheels independently;
    a control lever directly changing a posture of said step plate indirectly changing the posture of said step plate through said vehicle body; and
    wherein said control lever is supported in a turnable manner by said vehicle body, and a return biasing mechanism is provided to bias and return said control lever toward an initial position after said control lever is operated.

2. A coaxial two-wheel vehicle comprising:
    a step plate for a rider to ride on;
    a vehicle body supporting said step plate to be capable of changing a posture of the step plate in a roll direction around a roll axis, and wherein a traveling direction has a component extending in a direction of the roll axis;
    a pair of wheels disposed at both sides of said vehicle body, and wherein an axis extending through said pair of wheels is orthogonal to said roll axis, and wherein the pair of wheels are rotatably supported by the vehicle body;
    a pair of wheel drivers driving and rotating said pair of wheels independently;
    a control lever directly changing a posture of said step plate or indirectly changing the posture of said step plate through said vehicle body;
    wherein said vehicle body includes a parallel link mechanism having a vehicle body upper member and a vehicle body lower member that are disposed above and below in parallel with each other, and a pair of lateral members are disposed left and right in parallel with each other and are connected to said vehicle body upper member and vehicle body lower member in a turnable manner; and said step plate is divided into two divided steps individually fixed to said pair of lateral members and said pair of wheels are supported by said pair of lateral members through said pair of wheel drivers.

3. A coaxial two-wheel vehicle comprising:

a step plate for a rider to ride on;

a vehicle body supporting said step plate to be capable of changing a posture of the step plate in a roll direction around a roll axis, and wherein a traveling direction has a component extending in a direction of the roll axis;

a pair of wheels disposed at both sides of said vehicle body, and wherein an axis extending through said pair of wheels is orthogonal to said roll axis, and wherein the pair of wheels are rotatably supported by the vehicle body;

a pair of wheel drivers driving and rotating said pair of wheels independently;

a control lever directly changing a posture of said step plate or indirectly changing the posture of said step plate through said vehicle body; and wherein said step plate is divided into two divided steps which are individually supported by said vehicle body in a manner capable of changing a posture and which are connected by a connecting link in a turnable manner, and said two divided steps are capable of changing a posture in synchronization with an operation of said control lever by connecting said control lever to a middle portion of said connecting link in a turnable manner.

4. A coaxial two-wheel vehicle according to claim 1, wherein said control lever is fixed to said step plate and a posture of said step plate can be changed by an operation of said control lever.

5. A coaxial two-wheel vehicle according to claim 2, wherein a first elastic member generating a spring force orthogonally maintaining respective angles formed by said vehicle body upper member and vehicle body lower member and said pair of lateral members is interposed between the vehicle body upper member and vehicle body lower member.

6. A coaxial two-wheel vehicle comprising:

a step plate for a rider to ride on;

a vehicle body supporting said step plate to be capable of changing a posture of the step plate in a roll direction around a roll axis, and wherein a traveling direction has a component extending in a direction of the roll axis;

a pair of wheels disposed at both sides of said vehicle body, and wherein an axis extending through said pair of wheels is orthogonal to said roll axis, and wherein the pair of wheels are rotatably supported by the vehicle body;

a pair of wheel drivers driving and rotating said pair of wheels independently;

a control lever directly changing a posture of said step plate or indirectly changing the posture of said step plate through said vehicle body;

wherein said control lever is fixed to said step plate and a posture of said step plate can be changed by an operation of said control lever; and wherein an elastic member generating a spring force maintaining said step plate parallel with said vehicle body is interposed between said step plate and the vehicle body.

7. A coaxial two-wheel vehicle according to claim 1 further comprising:

a posture detector detecting an angle between said step plate or control lever and a gravitational axis to output a detection signal, wherein said pair of wheel drivers are driven and controlled based on the signal detected by said posture detector such that predetermined centrifugal force is given.

8. A coaxial two-wheel vehicle according to claim 1, wherein a posture of said step plate is changed to accommodate a centrifugal force of said rider based on a control signal output to said pair of wheel drivers.

9. A coaxial two-wheel vehicle according to claim 1, wherein said vehicle body includes a saddle supporting at least part of the weight of said rider.

10. A coaxial two-wheel vehicle according to claim 1, wherein said vehicle body includes a plurality of control levers provided upright at a predetermined interval in a direction orthogonal to said traveling direction.

11. A coaxial two-wheel vehicle comprising:

a step plate for a rider to ride on;

a vehicle body supporting said step plate to be capable of changing a posture of the step plate in a roll direction around a roll axis, and wherein a traveling direction has a component extending in a direction of the roll axis;

a pair of wheels disposed at both sides of said vehicle body, and wherein an axis extending through said pair of wheels is orthogonal to said roll axis, and wherein the pair of wheels are rotatably supported by the vehicle body;

a pair of wheel drivers driving and rotating said pair of wheels independently;

a control lever directly changing a posture of said step plate or indirectly changing the posture of said step plate through said vehicle body; and wherein said control lever includes a turning control ring capable of adjusting drive velocity of said pair of wheel drivers.

12. A coaxial two-wheel vehicle according to claim 1, wherein said control lever includes a foot control portion to change a posture of said step plate by a foot of said rider.

13. A coaxial two-wheel vehicle comprising:

a step plate for a rider to ride on;

a vehicle body supporting said step plate to be capable of changing a posture of the step plate in a roll direction around a roll axis, and wherein a traveling direction has a component extending in a direction of the roll axis;

a pair of wheels disposed at both sides of said vehicle body, and wherein an axis extending through said pair of wheels is orthogonal to said roll axis, and wherein the pair of wheels are rotatably supported by the vehicle body;

a pair of wheel drivers driving and rotating said pair of wheels independently;

a control lever directly changing a posture of said step plate or indirectly changing the posture of said step plate through said vehicle body; and wherein said step plate includes first and second steps, and wherein the first step is closer to a first wheel of said pair of wheels and the second step is closer to a second wheel of said pair of wheels.

14. A coaxial two-wheel vehicle according to claim 13, wherein said first and second steps are supported by said vehicle so as to be capable of changing a posture about said roll axis.

15. A coaxial two-wheel vehicle according to claim 13, wherein a controller controls the posture of the first and second steps such that relative to a horizontal plane: (a) the first and second steps are inclined relative to the horizontal plane when the vehicle is making a turn on a flat horizontal surface, and (b) the first and second steps are substantially parallel to the horizontal plane when the vehicle is traveling in a straight path on an inclined surface such that one of said pair of wheels is higher than the other of said pair of wheels.

16. A coaxial two-wheel vehicle according to claim 1, wherein the pair of wheels includes a first wheel and a second wheel, and wherein the pair of wheel drivers includes a first wheel driver which imparts a driving force to the first wheel and a second wheel driver which imparts a driving force to the second wheel.

17. A coaxial two-wheel vehicle comprising:
a step plate for a rider to ride on;
a vehicle body supporting said step plate to be capable of changing a posture of the step plate in a roll direction around a roll axis, and wherein a traveling direction has a component extending in a direction of the roll axis;
a pair of wheels disposed at both sides of said vehicle body orthogonal to said roll axis, and wherein the pair of wheels are rotatably supported by the vehicle body;
at least one wheel driver providing a driving force for rotating at least one of said pair of wheels;
a control lever directly changing a posture of said step plate or indirectly changing the posture of said step plate through said vehicle body; and
wherein the step plate includes a first step and a second step, and wherein a controller controls the posture of the first and second steps such that relative to a horizontal plane: (a) the first and second steps are inclined relative to the horizontal plane when the vehicle is making a turn on a flat horizontal surface, and (b) the first and second steps are substantially parallel to the horizontal plane when the vehicle is traveling in a straight path on an inclined surface such that one of said pair of wheels is higher than the other of said pair of wheels.

18. A coaxial two-wheel vehicle according to claim 17, wherein the pair of wheels includes a first wheel and a second wheel, and wherein the at least one wheel driver includes a first wheel driver providing a driving force driving the first wheel and a second wheel driver providing a driving force driving the second wheel, and wherein the first and second wheel drivers are controlled to rotate the first and second wheels at different speeds for turning of the vehicle.

19. A coaxial two-wheel vehicle according to claim 17, further including a posture sensor for sensing a posture of the step plate or the control lever.

* * * * *